United States Patent [19]

Nakaoka et al.

[11] Patent Number: 5,726,807
[45] Date of Patent: Mar. 10, 1998

[54] SMALL LIGHT WEIGHT HEAD-MOUNTED OR FACE-MOUNTED IMAGE DISPLAY APPARATUS

[75] Inventors: Masaya Nakaoka; Koichi Takahashi, both of Hachioji; Takayoshi Togino, Koganei, all of Japan

[73] Assignee: Olympus Optical Co., Ltd., Tokyo, Japan

[21] Appl. No.: 570,861

[22] Filed: Dec. 12, 1995

[30] Foreign Application Priority Data

| Dec. 13, 1994 | [JP] | Japan | 6-308980 |
| Apr. 1, 1995 | [JP] | Japan | 7-000034 |

[51] Int. Cl.$^6$ ................................................ G02B 27/14
[52] U.S. Cl. ........................................ 359/631; 359/630
[58] Field of Search ........................... 359/630, 631, 359/364, 365, 366, 633, 637

[56] References Cited

U.S. PATENT DOCUMENTS

| 4,026,641 | 5/1977 | Bosserman et al. | 359/869 |
| 4,669,810 | 6/1987 | Wood | 359/15 |
| 4,854,688 | 8/1989 | Hayford | 359/433 |
| 5,093,567 | 3/1992 | Staveley | 250/221 |
| 5,384,654 | 1/1995 | Iba | 359/364 |
| 5,436,765 | 7/1995 | Togino | 359/631 |
| 5,479,224 | 12/1995 | Yasugaki | 353/101 |
| 5,517,366 | 5/1996 | Togino | 359/850 |
| 5,539,578 | 7/1996 | Togino | 359/630 |
| 5,546,227 | 8/1996 | Yasugaki | 359/630 |
| 5,640,275 | 6/1997 | Bourguignat et al. | 359/630 |
| 5,646,783 | 7/1997 | Banbury | 359/630 |

FOREIGN PATENT DOCUMENTS

| 62-214782 | 9/1987 | Japan. |
| 3-101709 | 4/1991 | Japan. |
| 5-323229 | 12/1993 | Japan. |

*Primary Examiner*—David C. Nelms
*Assistant Examiner*—Ricky Mack
*Attorney, Agent, or Firm*—Cushman, Darby & Cushman IP Group of Pillsbury, Madison & Sutro LLP

[57] ABSTRACT

An image display apparatus, e.g. a head-mounted image display apparatus, which is capable of satisfactorily correcting field curvature and other aberrations in an optical system simultaneously, and which enables even an image of high resolution to be sufficiently clearly observed, without forming an intermediate image. The apparatus has an image display device (6) for displaying an image, and an optical system for projecting an image formed by the image display device (6) without forming an intermediate image and for leading the projected image to an observer's eyeball (1). The optical system includes at least one concave mirror (4) having a rotationally asymmetric reflecting surface which is concave toward the observer's eyeball and decentered with respect to an optical axis, and at least one optical element (9) of positive refractive power which is disposed between the concave mirror (4) and the image display device (6).

35 Claims, 15 Drawing Sheets

Eyeball

Two-dimensional image display device

Observer's eyeball position

Relay optical system

Concave reflecting mirror

Combiner

Relay optical system

CRT

Reflection type holographic element

Image display device
Ocular lens

Image display device
Ocular lens

SMALL LIGHT WEIGHT HEAD-MOUNTED OR FACE-MOUNTED IMAGE DISPLAY APPARATUS

BACKGROUND OF THE INVENTION

The present invention relates to an image display apparatus and, more particularly, to a head- or face-mounted image display apparatus that can be retained on the observer's head or face.

A face-mounted image display apparatus is demanded to have as light a weight as possible and as small a size as possible in order to reduce the user's fatigue. Particularly, the length to which the image display apparatus projects from the user's face when the user wears the apparatus on his/her face is demanded to be as short as possible in order to improve the weight balance of the apparatus when fitted to the user's face. Under these circumstances, a face-mounted image display apparatus using an optical system that transmits an image without forming an intermediate image has heretofore been proposed, in which reduction of the size and weight is achieved by making it unnecessary to use a relay optical system.

For example, U.S. Pat. No. 4,026,641 proposes an optical system that transmits an image without forming an intermediate image. In the proposed optical system, as shown in FIG. 23, an image of an image display device, e.g., a CRT, is transferred to an object surface by an image transfer device, and the image transferred to the object surface is displayed as a virtual image by a toric reflector which is decentered with respect to the optical axis, thereby enabling a compact and light-weight optical system to be provided.

Japanese Patent Application Unexamined Publication Number (hereinafter referred to as "JP(A)") 5-323229, proposed by the present applicant, discloses an optical system in which, as shown in FIG. 24, an image of small field curvature is transmitted without forming an intermediate image by a concave mirror having such a configuration that the curvature becomes stronger as the distance from the optical axis increases toward the periphery of the concave mirror.

There has also been known an image display apparatus which is disclosed in JP(A) 3-101709. In the conventional image display apparatus, as shown in FIG. 25 (which illustrates an optical ray trace of the apparatus), an image that is displayed by a two-dimensional image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of conventional image display apparatus. In this apparatus, as shown in FIG. 26, an image of a CRT is transmitted through a relay optical system to form an intermediate image, and the image is projected into an observer's eye by a combination of a reflection type holographic element and a combiner having a hologram surface.

JP(A) 62-214782 discloses another type of conventional image display apparatus. As shown in FIGS. 27(a) and 27(b), the conventional image display apparatus is designed to enable an image of an image display device to be directly observed as an enlarged image through an ocular lens.

However, U.S. Pat. No. 4,026,641 suffers from the problem that the projected virtual image is curved because of the field curvature produced by the optical system, and therefore, the periphery of the image looks unsharp. The optical system of JP(A) 5-323229 produces a small field curvature, but suffers from other aberrations which are produced by the concave mirror. In recent years, high-resolution liquid crystal and other display devices have been developed. Therefore, when an optical system having a correspondingly high resolution is needed, the conventional method may become incapable of coping with the demand.

Further, JP(A) 5-323229 suffers from another problem: Since a decentered concave mirror is employed in the optical system, the image surface cannot be perpendicular to the optical axis. If an image display device which emits a relatively small amount of light in directions other than a direction perpendicular to the display surface, e.g. a liquid crystal display device, is used in an optical system wherein the image surface is not perpendicular to the optical axis, the light quantity may be insufficient for observation of a clear image.

In an image display apparatus of the type in which an image of an image display device is relayed as in the image display apparatuses shown in FIGS. 25 and 26, several lenses must be used as a relay optical system in addition to an ocular optical system, regardless of the type of ocular optical system. Consequently, the optical path length increases, and the optical system increases in both size and weight. In a layout such as that shown in FIGS. 27(a) and 27(b), the amount to which the apparatus projects from the observer's face undesirably increases. Further, since an image display device and an illumination optical system are attached to the projecting portion of the apparatus, the apparatus becomes increasingly large and heavy.

Since a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head, causing the observer to be readily fatigued. Further, when the observer moves or turns with the apparatus fitted to his/her head, the apparatus may collide with something. That is, it is important for a head-mounted image display apparatus to be small and light. An essential factor in determining the size and weight of the apparatus is the layout of the optical system.

However, if an ordinary magnifier alone is used as an ocular optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced, as shown in FIG. 23.

SUMMARY OF THE INVENTION

In view of the above-described problems of the conventional techniques, an object of the present invention is to provide an optical system capable of satisfactorily correcting field curvature and other aberration simultaneously in an image display apparatus which forms no intermediate image, thereby providing an image display apparatus which enables even an image of high resolution to be sufficiently clearly observed.

Another object of the present invention is to provide an image display apparatus, e.g. a head-mounted image display apparatus, which enables observation of a clear image at a wide field angle, and which is extremely small and light and hence unlikely to cause the observer to fatigued.

To attain the first object, according to a first aspect of the present invention, there is provided a first image display apparatus having an image display device for displaying an image, and an optical system for projecting an image formed by the image display device without forming an intermediate image and for leading the projected image to an observer's eyeball. The optical system includes at least one concave mirror having a rotationally asymmetric reflecting surface which is concave toward the observer's eyeball and decentered with respect to an optical axis, and at least one optical element of positive refractive power which is disposed between the concave mirror and the image display device.

In this case, the optical element of positive refractive power may have at least one surface which is decentered with respect to the optical axis. The optical element of positive refractive power may be a positive meniscus lens having a concave surface directed toward the image display device.

To attain the second object, according to a second aspect of the present invention, there is provided an image display apparatus having an image display device for displaying an image, and an ocular optical system for projecting an image formed by the image display device and for leading the projected image to an observer's eyeball. The ocular optical system has at least two surfaces, of which a surface which is closer to the observer's eyeball is defined as a first surface, and a surface following the first surface is defined as a second surface. The space between the first and second surfaces is filled with a medium having a refractive index n larger than 1 (n>1). Moreover, the at least two surfaces are decentered in the same direction with respect to an observer's visual axis defined according to when the observer sees the center of the projected image. Further, the second surface is a curved reflecting or semitransparent surface which is concave toward the observer's eyeball. Furthermore, the first and second surfaces have different curvatures and are arranged such that light rays emanating from the image display device are refracted by the first surface and then reflected by the second surface, and the reflected light rays are further refracted by the first surface, thereby allowing a first-order image of the image display device formed by the ocular optical system to enter the observer's eyeball.

Another image display apparatus according to the second aspect of the present invention has an image display device for displaying an image, and an ocular optical system for projecting an image formed by the image display device and for leading the projected image to an observer's eyeball. The ocular optical system has at least two surfaces, of which a surface which is closer to the observer's eyeball is defined as a first surface, and a surface following the first surface is defined as a second. The space between the first and second surfaces is filled with a medium having a refractive index n larger than 1 (n>1). Moreover, the at least two surfaces are decentered in the same direction with respect to an observer's visual axis lying when the observer sees the center of the projected image. The second surface is a curved reflecting or semitransparent surface which is concave toward the observer's eyeball. Further, the first and second surfaces have different curvatures and are arranged such that light rays emanating from the image display device are refracted by the first surface and then reflected by the second surface, and the reflected light rays are further refracted by the first surface, thereby allowing a first-order image of the image display device formed by the ocular optical system to enter the observer's eyeball. In addition, an optical element of positive refractive power is provided between the ocular optical system and the observer's eyeball.

In this case, the optical element of positive refractive power may be a lens of positive refractive power.

According to a third aspect of the present invention, there is provided an image display apparatus arranged according to the second aspect of the present invention, wherein the image display device is disposed forwardly of the observer's face, and the image display device is disposed so that the image display surface of the image display device faces in the forward direction from the observer's face, and the reverse side of the image display device faces opposite to the observer's face.

According to a fourth aspect of the present invention, there is provided an image display apparatus arranged according to the second aspect of the present invention, wherein the ocular optical system has a right ocular optical system for leading light to the observer's right eyeball, and a left ocular optical system for leading light to the observer's left eyeball, so that an image formed on the image display surface of the image display device is led to both the right and left ocular optical systems.

The reason for adopting the above-described arrangements in the present invention and the functions thereof will be explained below. It should be noted that the following explanation will be made on the basis of backward ray tracing in which light rays are traced from the observer's pupil position toward the image display device for the convenience of designing the optical system. Further, it is assumed that the direction of light rays emanating from the observer's pupil is taken as a Z-axis direction, and the concave mirror is decentered in the YZ-plane.

In the image display apparatus according to the first aspect of the present invention, the optical system has, in order from the observer's pupil side along the optical axis, a concave mirror having a decentered (tilted or shifted) rotationally asymmetric reflecting surface, an optical element of positive refractive power, and an image display device. Since the power for image formation is divided between two elements, that is, the concave mirror and the optical element of positive refractive power, the curvature of the concave mirror can be reduced. Accordingly, the field curvature produced by the concave mirror can be reduced. At the same time, the reduction of the curvature of the concave mirror makes it possible to reduce spherical aberration and hence possible to observe a favorable image. Further, the reduction of the curvature of the concave mirror allows the angle between the image surface and the optical axis to be close to a right angle.

Further, since the reflecting surface of the concave mirror has a rotationally asymmetric configuration, it is possible to correct astigmatism which occurs owing to the difference in power between a direction in which the concave mirror is decentered and a direction in which the concave mirror is not decentered. Accordingly, it is possible to realize favorable aberration correction.

In a face-mounted image display apparatus, it is necessary to ensure a sufficiently long distance from the pupil position to the first surface, that is, eye relief, so that the observer can wear glasses or the like. On the other hand, it is desirable that the length to which the image display apparatus projects from the user's face when the apparatus is fitted to the user's face should be minimized. Therefore, it is more desirable for the optical element of positive refractive power to lie closer to the image display device than the concave mirror than to be closer to the pupil than the concave mirror because, for the same eye relief, the length to which the image display apparatus projects from the observer's face can be made shorter by disposing the optical element at a position closer to the image display device than the concave mirror.

Further, as the optical element of positive refractive power is decentered by shifting it, the amount of field curvature produced by the optical element changes. Therefore, the inclination of the image surface with respect to the optical axis, which is caused by the concave mirror, can be corrected by giving an appropriate shift to the optical element of positive refractive power. Thus, it becomes possible to stand the image surface at an angle closer to right angles with respect to the optical axis.

By tilting the optical element of positive refractive power, comatic aberration produced by the concave mirror can be readily corrected. The reason for this is that tilting the optical element of positive refractive power makes it possible to change the amount of comatic aberration produced by the concave mirror, and thus the comatic aberration can be favorably corrected by giving an appropriate tilt to the optical element of positive refractive power.

Further, the optical element of positive refractive power must be disposed so as not to eclipse light rays lying from the pupil to the concave mirror. Therefore, the optical element of positive refractive power must be disposed more than a certain distance away from the concave mirror; this imposes a restriction on paraxial design. Therefore, as shown in FIG. 2, which illustrates the optical system in Example 2 (described later), a positive meniscus lens 9 is used as the optical element of positive refractive power, and it is disposed so that its concave surface faces toward an image display device 6. By doing so, the principal point of the positive meniscus lens 9 can be placed in light rays lying from a pupil 1 to a concave mirror 4, and the paraxial design freedom increases. Thus, it becomes possible to design an optical system with less aberration. This is particularly advantageous to an optical system having a large pupil diameter, in which the light beam diameter is large. It should be noted that, if the pupil diameter is large in a face- or head-mounted image display apparatus, it becomes unnecessary to make adjustment when the user fits the apparatus to his/her face or head, e.g. adjustment of the interpupillary distance, that is, the distance between the eyes, and hence possible to reduce troublesomeness imposed on the user.

If a cemented positive lens is used as the optical element of positive refractive power, it is possible to suppress lateral chromatic aberration produced by the optical element. Further, if a back-coated mirror is used as the concave mirror, it is also possible to correct lateral chromatic aberration produced by the back-coated mirror, and thus even an image of high resolution can be sufficiently clearly observed.

Incidentally, a back-coated mirror has advantages over a surface-coated mirror in that it is superior in durability, shows a minimal change with time and has resistance to dust. In addition, when used as a concave mirror, a back-coated mirror makes it possible to change the surface configuration without changing the focal length; this is extremely advantageous from the viewpoint of aberration correction, and it becomes possible to obtain an image of high resolution. Accordingly, it is also desirable to use a back-coated mirror as the concave mirror.

If the focal length of the above-described optical element of positive refractive power and the focal length of the entire optical system satisfy the following condition, it is possible to reduce the power of the concave mirror and to fully exhibit the aberration correcting effect, and it is also possible to sufficiently reduce aberration occurring because of the power of the optical element:

$$1 < f_y/f_{yo} < 5 \text{ or } 1 < f_x/f_{xo} < 5 \tag{1}$$

where $f_y$ and $f_x$ are the focal lengths in the Y- and X-axis directions, respectively, of the optical element of positive refractive power, and $f_{yo}$ and $f_{xo}$ are the focal lengths in the Y- and X-axis directions, respectively, of the entire optical system.

It should be noted that, if the relationship in the above condition (1) satisfies the following condition (1)', it is possible to reduce the power of the concave mirror in both the X- and Y-axis directions simultaneously and to exhibit the aberration correcting effect even more remarkably. Moreover, the aberration produced by the optical element can also be reduced to an extremely small quantity. It is particularly useful when a high-resolution image display device is used:

$$1.1 < f_y/f_{yo} < 2.5 \text{ or } 1.1 < f_x/f_{xo} < 2.5 \tag{1'}$$

In the image display apparatus according to the second aspect of the present invention, the ocular optical system has two surfaces, that is, a first surface and a second surface, which are provided with different curvatures. By doing so, it is possible to correct both spherical and comatic aberrations produced by the second surface tilted so as to be decentered, and hence possible to provide the observer a clear observation image having a wide exit pupil diameter and a wide field angle.

In general, a concave mirror produces strong negative comatic aberration when the pupil position lies further than the center of curvature as viewed from the reflecting surface of the concave mirror. In order to correct the strong negative comatic aberration, in the present invention the space between the first and second surfaces, which constitute a concave mirror, is filled with a medium having a refractive index n larger than 1 (n>1), and the first and second surfaces are provided with different curvatures. By doing so, the height of light rays incident on the second surface can be reduced by utilizing the refraction of light rays at the first surface. Thus, the strong negative comatic aberration produced by the concave mirror can be reduced to a relatively small quantity.

In the image display apparatus according to the second aspect of the present invention, the observation image of the image display device is not formed in the air as a real intermediate image by a relay optical system but projected directly into the observer's eyeball as an enlarged image, thereby enabling the observer to view the enlarged image of the image display device as a virtual image. Accordingly, the optical system can be formed by using a minimal number of optical elements. Further, since the image display apparatus requires only a concave mirror (magnifier) that is provided immediately in front of the observer's face in a configuration conformable to the curve of his/her face as an optical element for enlarging and projecting an observation image, the amount to which the optical system projects from the observer's face can be reduced to an extremely small value. Thus, a compact and light-weight image display apparatus can be realized.

It is important that the first surface of the ocular optical system should be a surface of negative refractive power which is concave toward the observer's eyeball. If the first surface is provided with negative refractive power, it produces negative spherical aberration. The negative spherical aberration cancels the positive spherical aberration produced by the concave mirror, thus effectively correcting spherical aberration produced in the ocular optical system.

In this case, relatively large comatic aberration occurs. As a whole, however, aberrations can be corrected with good balance, and a favorable result can be obtained. However, if the curvature of the first surface is approximately equal to the curvature of the second surface, aberration correcting effect for both comatic and spherical aberrations is unfavorably reduced.

If a back-coated mirror is used as the concave mirror in the image display apparatuses according to the first and second aspects of the present invention, it is important that the curvature radius $R_{y1}$ of the transmitting surface of the back-coated mirror and the curvature radius $R_{y2}$ of the reflecting surface of the mirror should satisfy the following condition:

$$R_{y1}/R_{y2} < 2 \qquad (2)$$

The condition (2) is important for correction of comatic aberration, particularly higher-order comatic aberration, or coma flare produced by the second surface, which is tilted. It is particularly important to satisfy the condition (2) when the inclination angle of the reflecting surface is large.

In an image display apparatus using an ocular optical system in which a tilted concave mirror is disposed in front of an observer's eyeball as in the present invention, light rays are incident obliquely on the concave mirror, and therefore, complex comatic aberration which is not symmetric with respect to the center axis of the concave mirror occurs. The complex comatic aberration increases as the inclination angle of the concave mirror becomes larger. In order to realize a compact and wide-field image display apparatus, the concave mirror must be tilted at a large angle. If the inclination angle of the concave mirror is not sufficiently large, the image display device and the observation optical path interfere with each other, and it is therefore difficult to ensure an observation image having a wide field angle. Accordingly, as the field angle of an image display apparatus becomes wider and the size thereof becomes smaller, the inclination angle of the concave mirror becomes larger, and how to correct higher-order comatic aberration becomes a serious problem. Therefore, it is important to satisfy the condition for comatic aberration correction, which is shown by the expression (2).

Further, it is important that the curvature radius $R_{y1}$ of the transmitting surface of the back-coated mirror and the curvature radius $R_{y2}$ of the reflecting surface of the mirror should satisfy the following condition:

$$R_{y1}/R_{y2} < 1 \qquad (3)$$

The condition (3) is also important for correction of comatic aberration, particularly higher-order comatic aberration, or coma flare produced by the reflecting surface, which is tilted. The condition (3) is particularly important when a field angle of approximately 30° or more is to be ensured. If $R_{y1}/R_{y2}$ is not smaller than the upper limit of the condition (3), i.e. 1, higher-order comatic aberration produced by the second surface cannot satisfactorily be corrected by the transmitting surface. Thus, it becomes difficult to obtain an observation image which is clear as far as the edges thereof.

Furthermore, it is important that the curvature radius $R_{y1}$ of the transmitting surface of the back-coated mirror and the curvature radius $R_{y2}$ of the reflecting surface of the mirror should satisfy the following condition:

$$R_{y1}/R_{y2} < 0.8 \qquad (4)$$

The condition (4) is also important for correction of comatic aberration, particularly higher-order comatic aberration, or coma flare produced by the reflecting surface, which is tilted. The condition (4) is particularly important when a field angle of approximately 35° or more is to be ensured. If $R_{y1}/R_{y2}$ is not smaller than the upper limit of the condition (4), i.e. 0.8, it becomes particularly difficult to correct higher-order comatic aberration produced by the reflecting surface at a wide field angle. Thus, it becomes difficult to obtain an observation image which is clear as far as the edges thereof.

It is also important for the reflecting surface to have a rotationally asymmetric configuration.

Assuming that the curvature radius of the reflecting surface of the back-coated mirror in a plane containing both the observer's visual axis and the center of the image display device is $R_{y2}$, and the curvature radius of the reflecting surface in a plane which perpendicularly intersects the above plane and which contains the observer's visual axis is $R_{x2}$, it is important that $R_{y2}$ and $R_{x2}$ should be different from each other.

The above is a condition for correcting aberration occurring because the reflecting surface of the back-coated mirror is tilted with respect to the visual axis. In general, if a spherical surface is tilted, the curvature for light rays incident on the surface in the plane of incidence and that in a plane perpendicularly intersecting the incidence plane differ from each other. Therefore, in an ocular optical system which is decentered with respect to the visual axis as in the present invention, an image on the visual axis lying in the center of the observation image is also astigmatically aberrated for the reason stated above. In order to correct the axial astigmatism, it is important that the reflecting surface of the back-coated mirror should be formed so that the curvature radius in the plane of incidence and that in a plane perpendicularly intersecting the incidence plane are different from each other.

It is important that the relationship between the curvature radii $R_{y2}$ and $R_{x2}$ of the reflecting surface of the back-coated mirror should satisfy the following condition:

$$R_{y2}/R_{x2} \leq 1 \qquad (5)$$

If $R_{y2}/R_{x2}$ exceeds the upper limit of the condition (5), i.e. 1, it becomes difficult to correct astigmatism occurring owing to the difference between the radius of curvature for light rays in the plane of incidence and that in a plane perpendicularly intersecting the incidence plane.

It is also important that the relationship between the curvature radii $R_{y2}$ and $R_{x2}$ of the reflecting surface of the back-coated mirror should satisfy the following condition:

$$R_{y2}/R_{x2} < 0.8 \qquad (6)$$

If $R_{y2}/R_{x2}$ is not smaller than the upper limit of the condition (6), i.e. 0.8, it becomes impossible to satisfactorily correct the above-described astigmatism. Consequently, the observation image becomes unsharp at the edge of the observation field of view, and it becomes impossible to observe the image at a wide field angle. Further, the inclination angle of the reflecting surface reduces, so that it becomes impossible to realize a compact image display apparatus.

In the image display apparatus according to the second aspect of the present invention, an optical element of positive refractive power is provided between the ocular optical system and the observer's eyeball. The optical element enables the beam diameter to reduce at the second surface of the ocular optical system, and hence reducing higher-order comatic aberrations. Thus, it is possible to observe an image clearly as far as the edges of the image display surface. Further, since a principal ray at the edge of the image is refracted by the optical element of positive refractive power, the height of light rays incident on the ocular optical system can be reduced, and it becomes possible to set a larger field angle than in a case where the ocular optical system alone is used.

By using a lens as the optical element of positive refractive power, it is possible to provide an image display apparatus which enables observation of an image that is clear as far as the edges of the image display surface at a wide field angle, with high productivity and at reduced cost.

By decentering the optical element of positive refractive power with respect to the visual axis, higher-order comatic aberration produced by the decentered second surface can be favorably corrected.

By using a cemented lens as the optical element of positive refractive power, lateral chromatic aberration produced by the lens of positive refractive power can be corrected; this is useful to ensure a clearer image and a wider field angle.

By using an anamorphic aspherical surface as the second surface of the ocular optical system, it becomes possible to correct not only astigmatism on the visual axis but also astigmatism and comatic aberration of the peripheral image.

It is preferable that the second surface of the ocular optical system should be decentered as well as tilted with respect to the visual axis. Decentration of the vertex of the second surface makes it possible to correct comatic aberrations asymmetrically introduced into an image which lies closer to the image display device as viewed from the visual axis and into an image which lies on the opposite side, and also enables the image display device to be disposed on a plane which is approximately perpendicular to the optical axis reflected by the second surface. This is effective when a liquid crystal display device which is inferior in viewing angle characteristics is used.

According to the third and fourth aspects of the present invention, there are provided techniques which relate to a layout for an optical system which is required to dispose an image display device in an image display apparatus in a compact form.

In an arrangement in which the image display device is tilted with respect to the visual axis, the thickness of the image display apparatus increases in the direction of the observer's visual axis defined according to when the observer sees forward because the tilted image display device must be accommodated in the image display apparatus. Consequently, the volumetric capacity of the image display apparatus increases, and the apparatus becomes heavy. Therefore, according to the third aspect of the present invention, the image display device is disposed so that the perpendicular from the display surface of the image display device is approximately parallel to the visual axis, thereby succeeding in reducing the overall size and weight of the image display apparatus.

According to the fourth aspect of the present invention, image display devices which are required for the observer's left and right eyes, respectively, are formed from a single image display device, thereby succeeding in reducing the overall size of the image display apparatus.

First, the image display apparatus according to the third aspect of the present invention will be explained. When a liquid crystal display device, for example, is used as an image display device, electrodes for controlling pixels, which constitute a display surface, and for controlling the brightness must be led out from a liquid crystal display board. For this wiring process, the common practice is to adopt an arrangement in which a liquid crystal display device is disposed on an electric circuit board larger than the display area, wiring is made on the board, and then the board is electrically connected to a controller by using a flexible circuit board or the like.

If the image display device is tilted with respect to the visual axis in the above-described arrangement, the relatively large electric circuit board is disposed obliquely to the visual axis, causing the image display apparatus to become large in volumetric capacity and heavy in weight. Therefore, according to the third aspect of the present invention, the image display device is disposed so that the perpendicular from the display surface is approximately parallel to the visual axis, thereby succeeding in reducing both the overall size and weight of the image display apparatus.

In general, if the optical path is bent by the second surface of the tilted concave mirror, the display surface of the image display device faces toward the second surface, so that, as shown in FIG. 21, the perpendicular from the display surface intersects the observer's visual axis 2. Accordingly, the observation image is undesirably tilted and cannot clearly be viewed unless the image display device 6 is tilted as shown by the dotted line in FIG. 21.

Therefore, the image display apparatus according to the third aspect of the present invention is arranged so that the observation image is not tilted even if the image display device 6 is disposed such that the perpendicular from the display surface is approximately parallel to the visual axis 2.

It is important to arrange the system so that the image for observation is not tilted even if the image display device 6 is disposed in the position shown by the solid line in FIG. 21.

Next, the condition that is necessary to satisfy in order to provide an observation image which is not tilted. First, the angle of inclination of the second surface with respect to the visual axis is reduced, thereby minimizing the inclination of the image display device with respect to the visual axis.

It is even more desirable to satisfy the following condition:

$$5°<\theta_2<25° \qquad (7)$$

where $\theta_2$ is the angle at which light rays on the observer's visual axis are reflected by the second surface in the backward ray tracing.

If $\theta_2$ is not larger than the lower limit of the condition (7), i.e. 5°, the image display device comes too close to the visual axis, so that, when the horizontal field angle of the observation image is to be widened to 30° or more, the observation image and the image display device interfere with each other. Thus, a wide field angle cannot be obtained.

If $\theta_2$ is not smaller than the upper limit of the condition (7), i.e. 25°, aberration produced when light rays are reflected by the second surface of the concave mirror increases, and the inclination of the object plane, in which the image display device is disposed, differs in the left and right ocular optical systems, and hence the inclination of the observation image differs in the left and right eyes. Thus, it becomes impossible to view the observation image with both the left and right eyes.

It is even more desirable to satisfy the following condition:

$$7°<\eta_2<15° \qquad (8)$$

By satisfying the condition (8), it is possible to construct an optical system having a wide field angle.

The meaning of the upper and lower limits of the condition (8) is the same as in the condition (7).

Next, it is important to set an appropriate value for the inclination of the first transmitting surface, counted from the observer's eyeball side, with respect to light rays on the visual axis in order to minimize the inclination of the image surface caused by the concave mirror. It is important in the present invention that the angle at which light rays enter the first surface in the backward ray tracing and the angle at which light rays enter the first surface from the second surface side should be set with good balance.

That is, it is important to satisfy the following condition:

$$0.6 < (\theta_1/\theta_3) \times n < 1.6 \qquad (9)$$

where $\theta_1$ is the angle between the first surface and light rays on the observer's visual axis when the axial light rays enter the first surface, $\theta_3$ is the angle between the first surface and the axial light rays when incident on the first surface after being reflected by the second surface, and n is the refractive index of a medium lying between the first and second surfaces.

If $(\theta_1/\theta_3) \times n$ is not larger than the lower limit of the condition (9), i.e. 0.6, the angle at which the axial light rays are incident on the first surface after being reflected by the second surface becomes undesirably large. Consequently, aberration caused by the decentration becomes excessively large and hence difficult to correct by another surface. If $(\theta_1/\theta_3) \times n$ is not smaller than the upper limit of the condition (9), i.e. 1.6, the angle at which the axial light rays enter the first surface becomes excessively large. Consequently, aberration caused by the decentration becomes excessively large and hence difficult to correct by another surface in the same way as in the above case.

It is even more desirable to satisfy the following condition:

$$0.8 < (\theta_1/\theta_3) \times n < 1.6 \qquad (10)$$

By satisfying the condition (10), it is possible to construct an ocular optical system of higher resolution.

The meaning of the lower limit of the condition (10) is the same as in the above-described condition (9). The lower limit of the condition (10) has been particularly set in order to reduce comatic aberration occurring when light rays are reflected by the decentered second surface.

The following is an explanation of a method of supplying an image to two ocular optical systems corresponding to the observer's left and right eyes by a single image display device in the image display apparatus according to the fourth aspect of the present invention.

It is important to dispose the image display device so that the perpendicular from the display surface of the image display device is approximately parallel to the visual axis, in the same way as in the image display apparatus according to the third aspect of the present invention. If an image is supplied to the two ocular optical systems from a single image display device with the image display surface left tilted, the observation image is viewed to be tilted because the image display surface is not on the same plane for the left and right ocular optical systems. In other words, even if an image displayed on a single image display device is led to the observer's left and right eyes by using a tilted concave mirror, since the left and right images are observed to be tilted, the images viewed with the two eyes cannot fuse into a single image.

In the present invention, it is also important to satisfy the following condition:

$$25 < d < 35 \qquad (11)$$

where d (millimeter) is the distance between the center of the display surface of the image display device and the observer's visual axis.

The upper and lower limits of the condition (11) have been set under the necessity of adjusting the interpupillary distance in conformity to the observer's eyes. If d is not greater than the lower limit of the condition (11), it is impossible to supply a clear image to a user having an interpupillary distance of 50 millimeters or less. If d is not less than the upper limit of the condition (11), a user having an interpupillary distance of 70 millimeters or more cannot observe a clear image.

It should be noted that in the present invention it becomes possible for the observer to view a stable observation image by providing a device for positioning both the image display device and the ocular optical system with respect to the observer's head.

By allowing both the image display device and the ocular optical system to be fitted to the observer's head with a positioning device, it becomes possible for the observer to view the observation image in a desired posture and from a desired direction.

Further, it becomes possible for the observer to view the observation image with both eyes without fatigue by providing a device for supporting at least two image display apparatuses (two ocular optical systems in the image display apparatus according to the fourth aspect of the present invention) at a predetermined spacing. Further, if images with a disparity therebetween are displayed on the right and left image display surfaces, and these images are observed with both eyes, it is possible to enjoy viewing a stereoscopic image.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
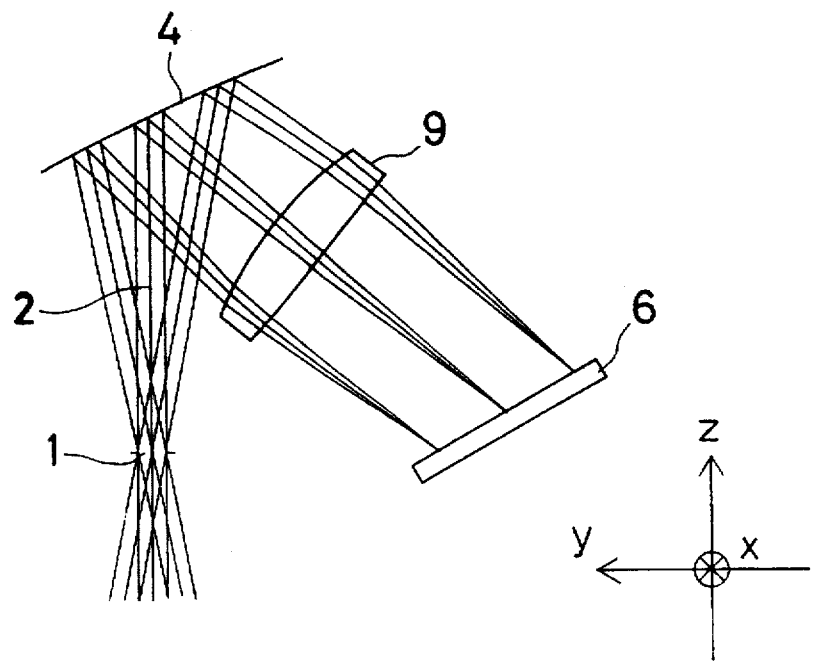
FIG. 1 is a sectional view of an image display apparatus according to Example 1 of the present invention.
Figure 2:
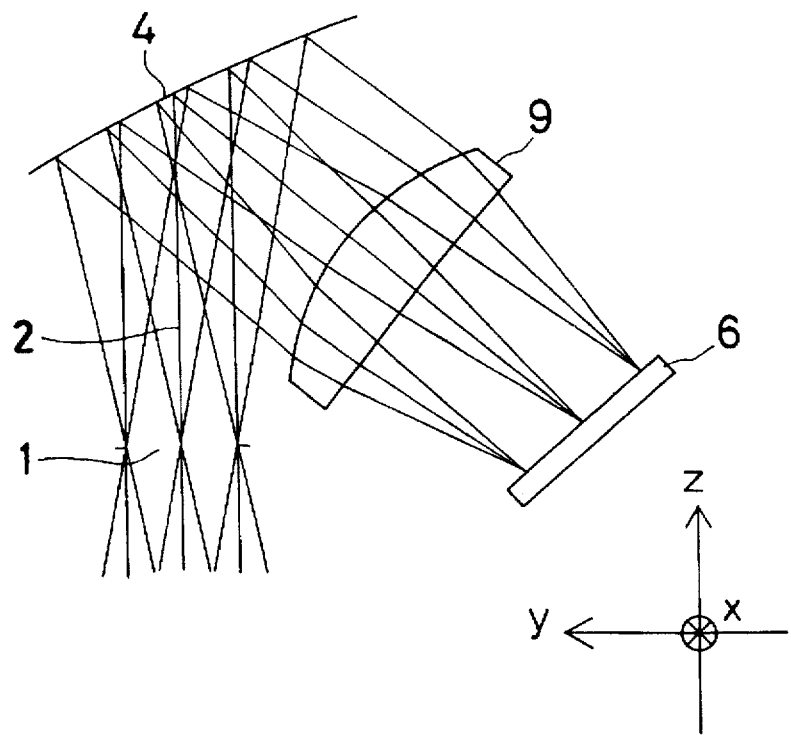
FIG. 2 is a sectional view of an image display apparatus according to Example 2 of the present invention.
Figure 3:
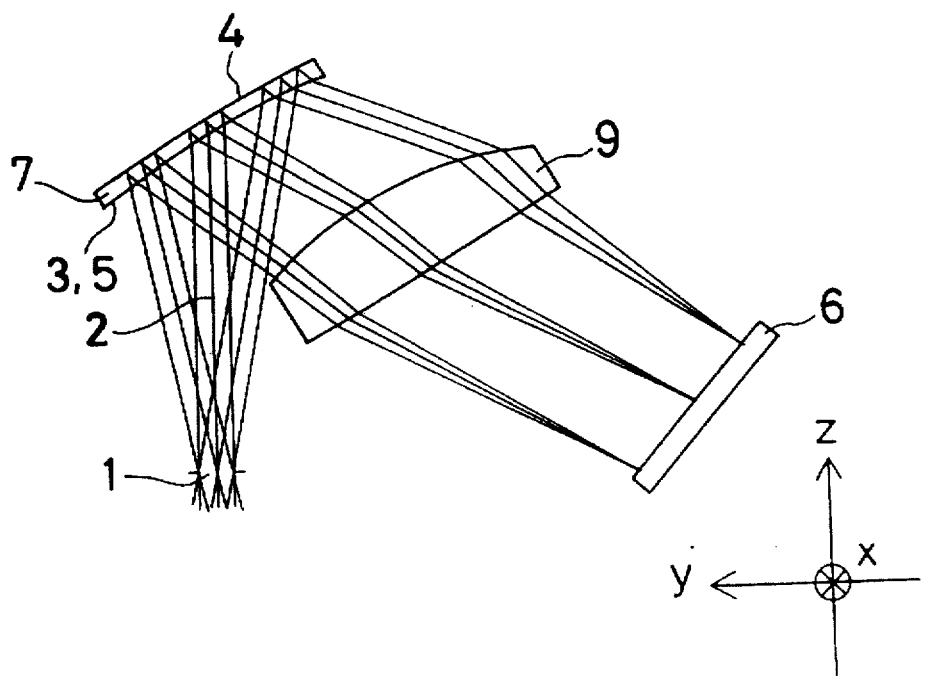
FIG. 3 is a sectional view of an image display apparatus according to Example 3 of the present invention.
Figure 4:
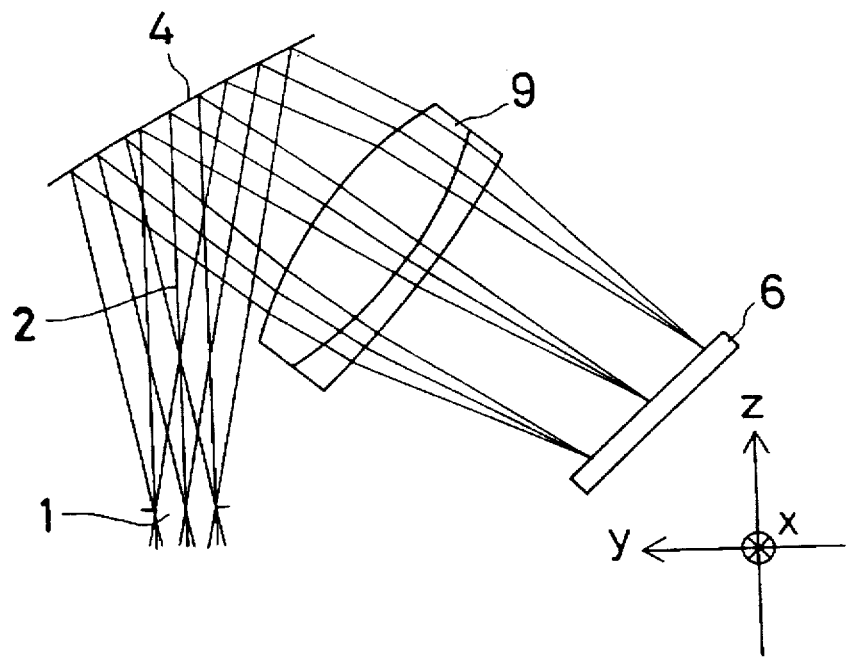
FIG. 4 is a sectional view of an image display apparatus according to Example 4 of the present invention.
Figure 5:
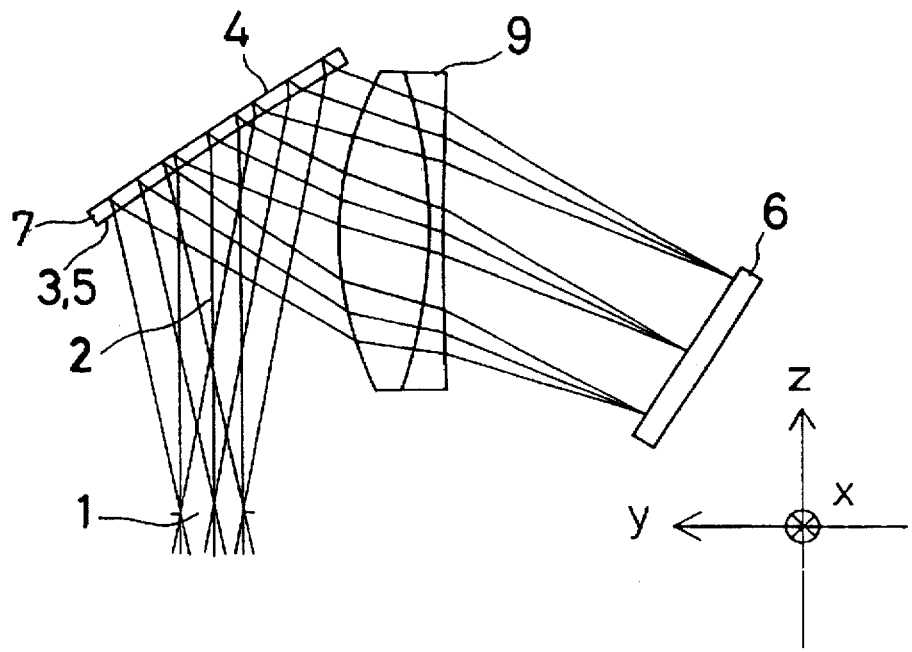
FIG. 5 is a sectional view of an image display apparatus according to Example 5 of the present invention.
Figure 6:
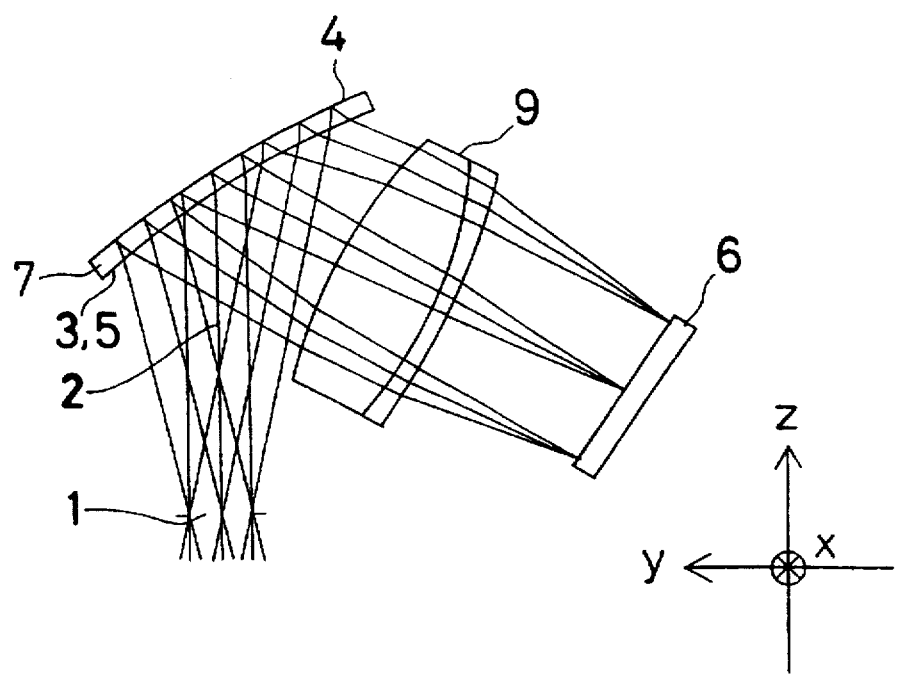
FIG. 6 is a sectional view of an image display apparatus according to Example 6 of the present invention.

Examples 1 to 20 of the image display apparatus according to the present invention will be described below with reference to the accompanying drawings.

Constituent parameters of Examples 1 to 19 will be shown later. In the following description, the surface Nos. are shown as ordinal numbers in backward tracing from the observer's pupil position 1 toward the image display device 6. In these examples, a coordinate system is defined as shown in FIGS. 1 to 19. That is, the direction of a visual axis passing through the center of the observer's pupil position 1 is taken as Z-axis, and the direction that is perpendicular to the plane of the figure is taken as X-axis, where the direction extending from the obverse side to the reverse side of the plane of the figure is defined as positive direction. A Y-axis which lies perpendicular to both the X- and Z-axes to form a right-handed coordinate system is taken in the plane of the figure. The optical axis is bent in the YZ-plane, which is parallel to the plane of the figure.

In the constituent parameters (shown later), regarding each surface for which eccentricities Y and Z and inclination angle e are shown, the eccentricity Y is a distance by which the surface decenters in the Y-axis direction from a reference axis (Z-axis) or a reference surface (first surface), and the eccentricity Z is a distance by which the surface decenters in the Z-axis direction from the reference axis or the reference surface. The inclination angle θ is the angle of inclination of the central axis of the surface from the Z-axis. In this case, positive θ means counterclockwise rotation. It should be noted that a surface without indication of eccentricities Y, Z and inclination angle θ is coaxial with respect to the preceding surface.

Regarding surface separations, the surface separation of the second surface is the distance from the first surface along the Z-axis direction, and a point on the second surface that lies on the Z-axis is defined as a reference point. A point which decenters from the reference point in the direction Y by the given eccentricity is the vertex of the second surface. Regarding the coaxial portions (optical elements 8 and 9 of positive refractive power), the surface separation is the axial distance from the surface concerned to the next surface. It should be noted that surface separations are shown with the direction of backward tracing along the optical axis defined as positive direction. However, the sign is inverted after the reflecting surface.

The anamorphic aspherical configuration of each surface may be expressed in the coordinate system defining the surface as follows:

$$Z = [(X^2/R_x) + (Y^2/R_y)]/[1 + \{1 - (1 + K_x)(X^2/R_x^2) - (1 + K_y)(Y^2/R_y^2)\}^{1/2}] +$$
$$AR[(1 - AP)X^2 + (1 + AP)Y^2]^2 + BR[(1 - BP)X^2 + (1 + BP)Y^2]^3$$

where $R_y$ is the paraxial curvature radius of the surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

The toric aspherical configuration of each surface may be expressed in the coordinate system defining the surface as follows:

$$F(Y)=(Y^2/R_y)/[1+\{1-(1+K_y)(Y^2/R_y^2)\}^{1/2}]+AY^4+BY^6$$

$$Z=F(Y)+\{X^2+Z^2-F^2(Y)\}/(2R_x)$$

where $R_y$ is the paraxial curvature radius of the surface in the YZ-plane (the plane of the figure); $R_x$ is the paraxial curvature radius in the XZ-plane; $K_y$ is the conical coefficient in the YZ-plane; and A and B are 4th- and 6th-order aspherical coefficients, respectively, in the YZ-plane.

The rotationally symmetric aspherical configuration of each surface may be expressed by.

$$Z=[(h^2/R)/[1+\{1-(1+K)(h^2/R^2)\}^{1/2}]+Ah^4+Bh^6(h^2=X^2+y^2)$$

where R is the paraxial curvature radius; K is the conical coefficient; and A and B are 4th- and 6th-order aspherical coefficients, respectively.

It should be noted that the refractive index of a medium lying between a pair of surfaces is expressed by the refractive index for the spectral d-line. Lengths are given in millimeters.

The following Examples 1 to 19 are image display apparatuses for the right eye. An image display apparatus for the left eye can be realized by disposing the constituent optical elements of each example in symmetrical relation to the apparatus for the right eye with respect to the XZ-plane.

In an actual apparatus, needless to say, the direction in which the optical axis is bent by the ocular optical system may be any of the upward, downward and sideward directions of the observer.

EXAMPLES 1 to 6

FIGS. 1 to 6 are sectional views of the optical systems of image display apparatuses designed for a single eye according to Examples 1 to 6. In the sectional views, reference numeral 1 denotes an observer's pupil position, 2 an observer's visual axis, 4 a concave mirror, 9 an optical element of positive refractive power, 6 an image display device, 3 a first surface of the concave mirror 4 when formed by using a back-coated mirror 7, and 5 a third surface (the same surface as the first surface 3) of the back-coated mirror 7 when used as the concave mirror 4.

In Examples 1, 2 and 4, the concave mirror 4 is a surface-coated mirror having an anamorphic surface. In Examples 3, 5 and 6, the concave mirror 4 is a back-coated mirror 7 having an anamorphic surface. The optical element 9 of positive refractive power is a single biconvex spherical lens in Example 1. In Example 2, the optical element 9 is a single positive meniscus spherical lens having a concave surface directed toward the image display device 6. In Example 3, the optical element 9 is a single lens having anamorphic surfaces at both sides thereof. In Example 4, the optical element 9 is a spherical cemented lens made up of a biconvex lens and a negative meniscus lens. In Example 5, the optical element 9 is a spherical cemented lens made up of a biconvex lens and a biconcave lens. In Example 6, the optical element 9 is a cemented lens made up of two single lenses each having an anamorphic surface.

The field angles and the pupil diameters in Examples 1 to 6 are as follows:

In Example 1, the horizontal field angle is 30°, the vertical field angle is 22.7°, and the pupil diameter is 4 millimeters.

In Example 2, the horizontal field angle is 30°, the vertical field angle is 22.7°, and the pupil diameter is 16 millimeters.

In Example 3, the horizontal field angle is 30°, the vertical field angle is 22.7°, and the pupil diameter is 4 millimeters.

In Example 4, the horizontal field angle is 30°, the vertical field angle is 22.7°, and the pupil diameter is 8 millimeters.

In Example 5, the horizontal field angle is 30°, the vertical field angle is 22.7°, and the pupil diameter is 8 millimeters.

In Example 6, the horizontal field angle is 35°, the vertical field angle is 26.6°, and the pupil diameter is 8 millimeters.

FIGS. 7 to 19 are sectional views of the optical systems of image display apparatuses designed for a single eye according to Examples 7 to 19. In the sectional views, reference numeral 1 denotes an observer's pupil position, 2 an observer's visual axis, 3 a first surface of an ocular optical system, 4 a concave mirror constituting a second surface of the ocular optical system, 5 a third surface (the same surface as the first surface 3) of the ocular optical system, 6 an image display device, 7 the ocular optical system having the first surface 3, the second surface (reflecting surface) 4 and the third surface 5, and 8 an optical element of positive refractive power.

The actual path of light rays in each Example is as follows: A bundle of light rays emitted from the image display device 6 enters the ocular optical system 7 while being refracted by the third surface 5 of the ocular optical system 7 and is reflected by the second surface (concave mirror) 4 and refracted by the first surface 3. Then, in Examples 7, 8, 14 to 19, the ray bundle is projected directly into the observer's eyeball with the observer's iris position or eyeball rolling center as the exit pupil 1; in Examples 9 to 13, the ray bundle passes through the optical element 8 of positive refractive power before being projected into the observer's eyeball with the observer's iris position or eyeball rolling center as the exit pupil 1. It should be noted that FIGS. 15 to 19 additionally show a line $n_3$ normal to the third surface 5 of the ocular optical system 7 at a position where an optical axis extending from the image display device 6 is incident on the third surface 5, a line $n_2$ normal to the second surface 4 of the ocular optical system 7 at a position where the optical axis from the image display device 6 is incident on the second surface 4, and a line $n_1$ normal to the first surface 3 at a position from which the optical axis exits from the first surface 3.

EXAMPLE 7

In this example, the horizontal field angle is 30°, the vertical field angle is 22.7°, and the pupil diameter is 4 millimeters. The first, second and third surfaces 3, 4 and 5 of the ocular optical system 7 are anamorphic aspherical surfaces.

EXAMPLE 8

In this example, the horizontal field angle is 30°, the vertical field angle is 22.7°, and the pupil diameter is 4 millimeters. The first and third surfaces 3 and 5 of the ocular optical system 7 are toric surfaces, while the second surface 4 is an anamorphic aspherical surface.

EXAMPLE 9

In this example, the horizontal field angle is 30°, the vertical field angle is 22.7°, and the pupil diameter is 4 millimeters. The first, second and third surfaces 3, 4 and 5 of the ocular optical system 7 are anamorphic aspherical surfaces. In addition, a single lens 8 of positive refractive power having spherical surfaces is provided without decentration between the pupil 1 and the ocular optical system 7.

EXAMPLE 10

In this example, the horizontal field angle is 35°, the vertical field angle is 26.6°, and the pupil diameter is 4 millimeters. The first, second and third surfaces 3, 4 and 5 of the ocular optical system 7 are anamorphic aspherical surfaces. In addition, a single lens 8 of positive refractive power having spherical surfaces is provided between the pupil 1 and the ocular optical system 7 in such a manner as to be decentered with respect to the visual axis 2.

EXAMPLE 11

In this example, the horizontal field angle is 40°, the vertical field angle is 30.6°, and the pupil diameter is 4 millimeters. The first, second and third surfaces 3, 4 and 5 of the ocular optical system 7 are anamorphic aspherical surfaces. In addition, a single lens 8 of positive refractive power having an aspherical surface at one side thereof and a spherical surface at the other side thereof is provided between the pupil 1 and the ocular optical system 7 in such a manner as to be decentered with respect to the visual axis 2.

EXAMPLE 12

In this example, the horizontal field angle is 40°, the vertical field angle is 30.6°, and the pupil diameter is 4 millimeters. The first, second and third surfaces 3, 4 and 5 of the ocular optical system 7 are anamorphic aspherical surfaces. In addition, a single lens 8 of positive refractive power having a decentered spherical surface at each side thereof is provided between the pupil 1 and the ocular optical system 7.

EXAMPLE 13

In this example, the horizontal field angle is 40°, the vertical field angle is 30.6°, and the pupil diameter is 4 millimeters. The first, second and third surfaces 3, 4 and 5 of the ocular optical system 7 are anamorphic aspherical surfaces. In addition, a single lens 8 of positive refractive power, which is a cemented lens made up of a pair of concave and convex lenses having a spherical surface at each side thereof, is provided between the pupil 1 and the ocular optical system 7 in such a manner as to be decentered with respect to the visual axis 2.

EXAMPLE 14

In this example, the horizontal field angle is 30°, the vertical field angle is 22.7°, and the pupil diameter is 4 millimeters. The first and third surfaces 3 and 5 of the ocular optical system 7 are plane surfaces, while the second surface 4 is a spherical surface.

EXAMPLE 15

In this example, the horizontal field angle is 30°, the vertical field angle is 22.7°, and the pupil diameter is 4 millimeters. The first, second and third surfaces 3, 4 and 5 of the ocular optical system 7 are anamorphic aspherical surfaces.

EXAMPLE 16

In this example, the horizontal field angle is 30°, the vertical field angle is 22.7°, and the pupil diameter is 4 millimeters. The first, second and third surfaces 3, 4 and 5 of the ocular optical system 7 are toric surfaces.

EXAMPLE 17

In this example, the horizontal field angle is 30°, the vertical field angle is 22.7°, and the pupil diameter is 4 millimeters. The first, second and third surfaces 3, 4 and 5 of the ocular optical system 7 are anamorphic aspherical surfaces.

EXAMPLE 18

In this example, the horizontal field angle is 30°, the vertical field angle is 22.7°, and the pupil diameter is 4 millimeters. The first, second and third surfaces 3, 4 and 5 of the ocular optical system 7 are anamorphic aspherical surfaces.

EXAMPLE 19

In this example, the horizontal field angle is 30°, the vertical field angle is 22.7°, and the pupil diameter is 4 millimeters. The first, second and third surfaces 3, 4 and 5 of the ocular optical system 7 are anamorphic aspherical surfaces.

It should be noted that in the above Examples the surface configurations are not necessarily limited to anamorphic aspherical and toric surface configurations, and that the surfaces may have other configurations, for example, rotationally symmetric aspherical and spherical surfaces, or sculptured surfaces. In the case of a surface configuration for which curvature, power, etc. cannot be defined, the curvature, power, etc. of the surface may be obtained by determining the curvature in an arbitrary region which is obtained from the differential of the configuration of a portion of the surface at the intersection between the surface and axial light rays extending on the visual axis to reach the image display device, along the axial light rays, and defining the obtained curvature as the curvature of that surface.

EXAMPLE 20

Figure 20:
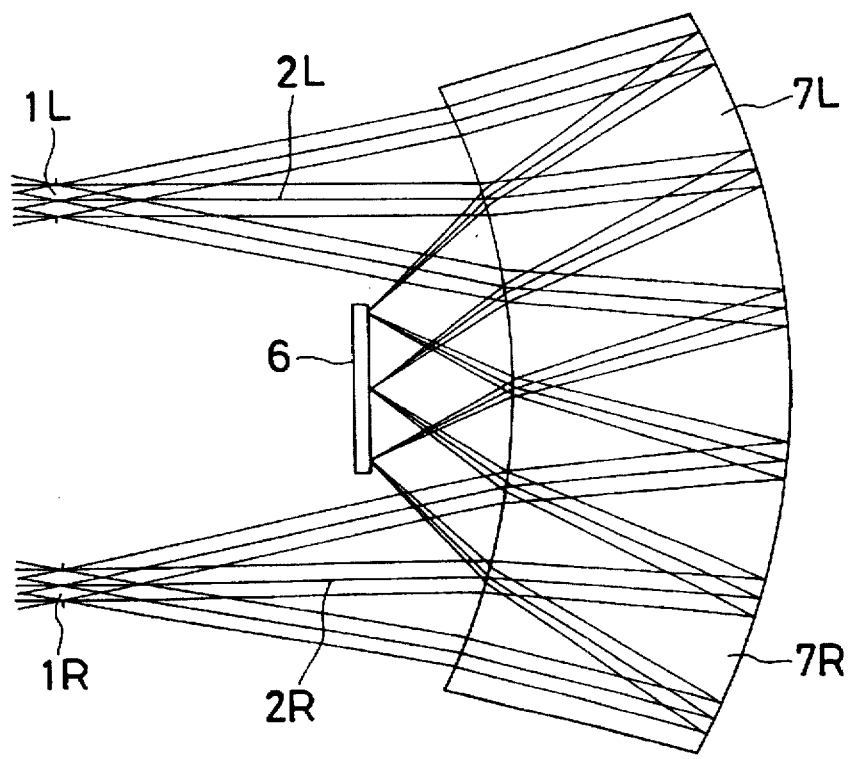
FIG. 20 is a horizontal sectional view of an image display apparatus according to Example 20 of the present invention.
Figure 21:
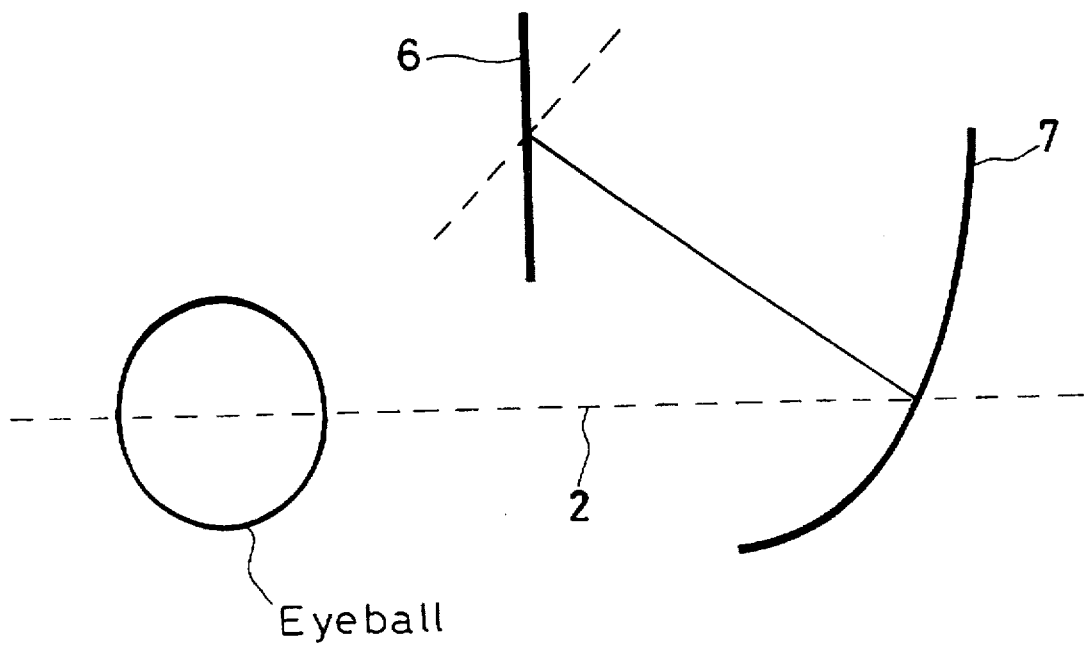
FIG. 21 illustrates the way in which an image display device is disposed in an image display apparatus according to a third aspect of the present invention.

FIG. 20 is a horizontal sectional view of an image display apparatus according to Example 20 of the present invention. The image display apparatus in this example is designed for both eyes of the observer. In this example, two ocular optical systems arranged as shown in Example 19 are used as left and right ocular optical systems $7_L$ and $7_R$, and an image displayed on a single image display device 6 is supplied to the left and right ocular optical systems $7_L$ and $7_R$. In the figure, reference symbols $1_L$ and $1_R$ denote observer's left and right pupil positions, and $2_L$ and $2_R$ denote observer's left and right visual axes.

Constituent parameters of the above Examples 1 to 19 will be shown below:

| Surface No. | Radius of curvature | Surface separation | Refractive index (Eccentricity) | Abbe's No. (Inclination angle) |
|---|---|---|---|---|
| | | Example 1 | | |
| 1 | ∞(pupil) | 77.82 | | |
| 2 | $R_y$ −516.62 | | (from Z-axis) | |
| | $R_x$ −256.38 | | Y −161.98 | |
| | $K_y$ 4.55 | | | |
| | $K_x$ 2.67 | | | |
| 3 | −48.55 | −8.5 | 1.51633 | 64.1 |
| | | | (from No. 1 surface) | |
| | | | Y −17.95 | θ 50° |
| | | | Z 32.36 | |
| 4 | 500 | | | |
| 5 | (display plane) | | (from No. 1 surface) | |
| | | | Y −50.36 | θ 29.44° |
| | | | Z 4.57 | |

$f_y/f_{y0} = 1.16$
$f_x/f_{x0} = 1.31$

-continued

| Surface No. | Radius of curvature | | Surface separation | Refractive index (Eccentricity) | Abbe's No. (Inclination angle) | |
|---|---|---|---|---|---|---|
| | | | Example 2 | | | |
| 1 | ∞(pupil) | | 77.43 | | | |
| 2 | $R_y$ | −393.51 | | (from Z-axis) | | |
| | $R_x$ | −235.63 | | Y −137.38 | | |
| | $K_y$ | 2.61 | | | | |
| | $K_x$ | 1.90 | | | | |
| 3 | | −40.04 | −12 | 1.51633 | 64.1 | |
| | | | | (from No. 1 surface) | | |
| | | | | Y −25.15 | θ | 50° |
| | | | | Z 28.89 | | |
| 4 | | −622.93 | | | | |
| 5 | (display plane) | | | (from No. 1 surface) | | |
| | | | | Y −56.76 | θ | 41.10° |
| | | | | Z 2.12 | | |

$f_y/f_{y0} = 1.17$
$f_x/f_{x0} = 1.29$

| | | | Example 3 | | | |
|---|---|---|---|---|---|---|
| 1 | ∞(pupil) | | 45 | | | |
| 2 | $R_y$ | −111.14 | | 1.51633 | 64.1 | |
| | $R_x$ | 136.35 | | (from Z-axis) | | |
| | | | | | θ | 30° |
| 3 | $R_y$ | −195.10 | | 1.51633 | 64.1 | |
| | $R_x$ | 7969.48 | | (from No. 1 surface) | | |
| | | | | Z 46.44 | θ | 30° |
| 4 | $R_y$ | −111.14 | | (from No. 1 surface) | | |
| | $R_x$ | 136.35 | | Z 45 | θ | 30° |
| 5 | $R_y$ | −52.34 | −12 | 1.51633 | 64.1 | |
| | $R_x$ | −65.24 | | (from No. 1 surface) | | |
| | | | | Y −20.26 | θ | 30° |
| | | | | Z 34.65 | | |
| 6 | $R_y$ | −1665.09 | | | | |
| | $R_x$ | 195.47 | | | | |
| 7 | (display plane) | | | (from No. 1 surface) | | |
| | | | | Y −64.62 | θ | 48.87° |
| | | | | Z 6.79 | | |

$f_y/f_{y0} = 1.59$
$f_x/f_{x0} = 1.60$
$R_{y1}/R_{y2} = 0.57$
$R_{y2}/R_{x2} = -0.024$

| | | | Example 4 | | | |
|---|---|---|---|---|---|---|
| 1 | ∞(pupil) | | 50 | | | |
| 2 | $R_y$ | −293.70 | | (from Z-axis) | | |
| | $R_x$ | −241.70 | | Y 6.36 | θ | 30° |
| | $K_y$ | −7.26 | | | | |
| | $K_x$ | −15.11 | | | | |
| | AR | $0.1163 \times 10^{-9}$ | | | | |
| | BR | $0.4048 \times 10^{-10}$ | | | | |
| | AP | $0.1405 \times 10^{+2}$ | | | | |
| | BP | $-0.1625 \times 10^{-2}$ | | | | |
| 3 | | −54.38 | −13.39 | 1.62 | 60.3 | |
| | | | | (from No. 1 surface) | | |
| | | | | Y −20.25 | θ | 51.21° |
| | | | | Z 39.88 | | |
| 4 | | 53.67 | −3 | 1.755 | 27.6 | |
| 5 | | 127.25 | | | | |
| 6 | (display plane) | | | (from No. 1 surface) | | |
| | | | | Y −62.55 | θ | −135.03° |
| | | | | Z 11.87 | | |

$f_y/f_{y0} = 1.39$
$f_x/f_{x0} = 1.47$

| | | | Example 5 | | | |
|---|---|---|---|---|---|---|
| 1 | ∞(pupil) | | 50 | | | |
| 2 | $R_y$ | −805.66 | | 1.5254 | 56.25 | |
| | $R_x$ | 203.47 | | (from Z-axis) | | |
| | $K_y$ | 0 | | Y −3.53 | θ | 32.54° |
| | $K_x$ | 0 | | | | |
| | AR | $-0.2665 \times 10^{-6}$ | | | | |
| | BR | $0.4539 \times 10^{-9}$ | | | | |
| | AP | $-0.7066 \times 10^{-1}$ | | | | |
| | BP | $-0.1071$ | | | | |
| 3 | $R_y$ | −405.82 | | 1.5254 | 56.25 | |
| | $R_x$ | −878.41 | | (from No. 1 surface) | | |

-continued

| Surface No. | Radius of curvature | | Surface separation | Refractive index (Eccentricity) | | Abbe's No. (Inclination angle) | |
|---|---|---|---|---|---|---|---|
| | $K_y$ | 0 | | Y | −15.84 | θ | 30° |
| | $K_x$ | 0 | | Z | 59.7 | | |
| | AR | $0.3407 \times 10^{-8}$ | | | | | |
| | BR | $-0.3777 \times 10^{-10}$ | | | | | |
| | AP | $0.2787 \times 10^{+1}$ | | | | | |
| | BP | $0.2000 \times 10^{-1}$ | | | | | |
| 4 | $R_y$ | −805.66 | | (from No. 1 surface) | | | |
| | $R_x$ | 203.47 | | Y | −3.53 | θ | 32.54° |
| | $K_y$ | 0 | | Z | 50 | | |
| | $K_x$ | 0 | | | | | |
| | AR | $-0.2665 \times 10^{-6}$ | | | | | |
| | BR | $0.4539 \times 10^{-9}$ | | | | | |
| | AP | $-0.7066 \times 10^{-1}$ | | | | | |
| | BP | −0.1071 | | | | | |
| 5 | | −44.47 | −12.02 | 1.62 | | 60.3 | |
| | | | | (from No. 1 surface) | | | |
| | | | | Y | −17.31 | θ | 88.33° |
| | | | | Z | 36.98 | | |
| 6 | | 66.17 | −1.52 | 1.755 | | 27.6 | |
| 7 | | −390.35 | | | | | |
| 8 | | (display plane) | | (from No. 1 surface) | | | |
| | | | | Y | −62.0 | θ | −122.81° |
| | | | | Z | 19.85 | | |

$f_y/f_{y0} = 1.50$
$f_x/f_{x0} = 1.67$
$R_{y1}/R_{y2} = 1.99$
$R_{y2}/R_{x2} = -0.46$

Example 6

| 1 | | ∞(pupil) | 55 | | | | |
|---|---|---|---|---|---|---|---|
| 2 | $R_y$ | −96.97 | | 1.5254 | | 56.25 | |
| | $R_x$ | 122.54 | | (from Z-axis) | | | |
| | $K_y$ | 0 | | Y | −28.56 | θ | 14.12° |
| | $K_x$ | 0 | | | | | |
| | AR | $0.7129 \times 10^{-7}$ | | | | | |
| | BR | $0.9095 \times 10^{-10}$ | | | | | |
| | AP | $-0.1295 \times 10^{+1}$ | | | | | |
| | BP | −0.3279 | | | | | |
| 3 | $R_y$ | −139.13 | | 1.5254 | | 56.25 | |
| | $R_x$ | −1015.83 | | (from No. 1 surface) | | | |
| | $K_y$ | 0 | | Y | −20.80 | θ | 22.05° |
| | $K_x$ | 0 | | Z | 55.73 | | |
| | AR | $-0.1675 \times 10^{-9}$ | | | | | |
| | BR | $-0.4352 \times 10^{-11}$ | | | | | |
| | AP | $-0.6328 \times 10^{+1}$ | | | | | |
| | BP | $0.2263 \times 10^{+1}$ | | | | | |
| 4 | $R_y$ | −96.97 | | (from No. 1 surface) | | | |
| | $R_x$ | 122.54 | | Y | −28.56 | θ | 14.12° |
| | $K_y$ | 0 | | Z | 55 | | |
| | $K_x$ | 0 | | | | | |
| | AR | $0.7129 \times 10^{-7}$ | | | | | |
| | BR | $0.9095 \times 10^{-10}$ | | | | | |
| | AP | $-0.1295 \times 10^{+1}$ | | | | | |
| | BP | −0.3279 | | | | | |
| 5 | $R_y$ | −72.93 | −14 | 1.60311 | | 60.7 | |
| | $R_x$ | 34.37 | | (from No. 1 surface) | | | |
| | $K_y$ | 0 | | Y | −15.22 | θ | 61.62° |
| | $K_x$ | 0 | | Z | 31.69 | | |
| | AR | $-0.3623 \times 10^{-8}$ | | | | | |
| | BR | $-0.1071 \times 10^{-9}$ | | | | | |
| | AP | $0.1161 \times 10^{+2}$ | | | | | |
| | BP | −0.6372 | | | | | |
| | | 56.21 | −2 | 1.80518 | | 25.4 | |
| 7 | $R_y$ | 80.52 | | | | | |
| | $R_x$ | −108.39 | | | | | |
| | $K_y$ | 0 | | | | | |
| | $K_x$ | 0 | | | | | |
| | AR | $-0.2465 \times 10^{-7}$ | | | | | |
| | BR | $0.6417 \times 10^{-9}$ | | | | | |
| | AP | $0.8294 \times 10$ | | | | | |
| | BP | −0.1382 | | | | | |
| 8 | | (display plane) | | (from No. 1 surface) | | | |
| | | | | Y | −53.29 | θ | 54.37° |
| | | | | Z | 15.35 | | |

$f_y/f_{y0} = 1.47$
$f_x/f_{x0} = 2.26$

-continued

| Surface No. | Radius of curvature | | Surface separation | Refractive index (Eccentricity) | Abbe's No. (Inclination angle) | |
|---|---|---|---|---|---|---|
| $R_{y1}/R_{y2}$ = 0.070 | | | | | | |
| $R_{y2}/R_{x2}$ = −0.14 | | | | | | |
| | | | Example 7 | | | |
| 1 | ∞(pupil) | | 50.000 | | | |
| 2 | $R_y$ | −115.364 | | | 1.5633 | 64.15 |
| | $R_x$ | −127.909 | | (from Z-axis) | | |
| | $K_y$ | −7.421305 | | Y  0 | θ | 30.0° |
| | $K_x$ | 0 | | | | |
| | AR | 8.46165 × 10⁻⁸ | | | | |
| | BR | −7.76339 × 10⁻¹⁸ | | | | |
| | AP | −1.87052 | | | | |
| | BP | 2.58902 × 10² | | | | |
| 3 | $R_y$ | −70.852 | 1.5633 | 64.15 | | |
| | $R_x$ | −70.635 | (fromNo. | 1 surface) | | |
| | $K_y$ | −1.36906 × 10⁻¹ | | Y  −16.545 | θ | 7.00° |
| | $K_x$ | −5.4533 × 10⁻² | Z | 58.547 | | |
| | AR | 3.62791 × 10⁻¹² | | | | |
| | BR | 3.72459 × 10⁻¹¹ | | | | |
| | AP | −7.25017 × 10 | | | | |
| | BP | −1.07422 | | | | |
| 4 | $R_y$ | −115.364 | | (from No. 1 surface) | | |
| | $R_x$ | −127.909 | | Y  0 | 0 | 30.00 |
| | $K_y$ | −7.421305 | | Z  50.000 | | |
| | $K_x$ | 0 | | | | |
| | AR | 8.46165 × 10⁻⁸ | | | | |
| | BR | −7.76339 × 10⁻¹⁸ | | | | |
| | AP | −1.87052 | | | | |
| | BP | 2.58902 × 10⁻² | | | | |
| 5 | (display plane) | | | (from No. 1 surface) | | |
| | | | | Y  −16.162 | θ | 16.1° |
| | | | | Z  28.408 | | |
| $R_{y1}/R_{y2}$ = 1.63 | | | | | | |
| $R_{y2}/R_{x2}$ = 1.00 | | | | | | |
| | | | Example 8 | | | |
| 1 | ∞(pupil) | | 32.000 | | | |
| 2 | $R_y$ | −36.183 | | | 1.5633 | 64.15 |
| | $R_x$ | 111.868 | | (from Z-axis) | | |
| | | | | Y  0 | θ | 30.00° |
| 3 | $R_y$ | −49.444 | | | 1.5633 | 64.15 |
| | $R_x$ | −97.994 | | (from No. 1 surface) | | |
| | $K_y$ | 0 | | Y  −32.692 | θ | −11.259° |
| | $K_x$ | 0 | | Z  39.000 | | |
| | AR | 2.36416 × 10⁻⁷ | | | | |
| | BR | −5.3209 × 10⁻¹⁰ | | | | |
| | AP | −5.56393 × 10⁻¹ | | | | |
| | BP | −1.18616 | | | | |
| 4 | $R_y$ | −36.183 | | (from No. 1 surface) | | |
| | $R_x$ | 111.868 | | Y  0 | θ | 30.00° |
| | | | | Z  32.000 | | |
| 5 | (display plane) | | | (from No. 1 surface) | | |
| | | | | Y  −23.089 | θ | 37.54° |
| | | | | Z  17.216 | | |
| $R_{y1}/R_{y2}$ = 0.73 | | | | | | |
| $R_{y2}/R_{x2}$ = 0.50 | | | | | | |
| | | | Example 9 | | | |
| 1 | ∞(pupil) | | 20.000 | | | |
| 2 | 89.043 | | 2.000 | | 1.4870 | 70.40 |
| 3 | −35.868 | | | | | |
| 4 | $R_y$ | −30.763 | | | 1.5633 | 64.15 |
| | $R_x$ | −58.178 | | (from No. 1 surface) | | |
| | $K_y$ | 8.5169 × 10⁻² | | Y  0 | θ | 30.00° |
| | $K_x$ | −8.323018 | | Z  42.660 | | |
| | AR | −8.98778 × 10⁻⁸ | | | | |
| | BR | 9.49781 × 10⁻¹⁰ | | | | |
| | AP | 4.09749 | | | | |
| | BP | −2.00615 | | | | |
| 5 | $R_y$ | −54.312 | | | 1.5633 | 64.15 |
| | $R_x$ | −72.939 | | (from No. 1 surface) | | |
| | $K_y$ | 0 | | Y  −21.154 | θ | 3.17° |
| | $K_x$ | 0 | | Z  49.660 | | |
| | AR | 4.30715 × 10⁻⁷ | | | | |
| | BR | 5.97047 × 10⁻¹⁵ | | | | |
| | AP | −1.87208 | | | | |

-continued

| Surface No. | Radius of curvature | | Surface separation | Refractive index (Eccentricity) | | Abbe's No. (Inclination angle) | |
|---|---|---|---|---|---|---|---|
| | BP | $-4.75833 \times 10$ | | | | | |
| 6 | $R_y$ | $-30.763$ | | (from No. 1 surface) | | | |
| | $R_x$ | $-58.178$ | | Y | 0 | θ | 30.00° |
| | $K_y$ | $8.5169 \times 10^{-2}$ | | Z | 42.660 | | |
| | $K_x$ | $-8.323018$ | | | | | |
| | AR | $-8.98778 \times 10^{-8}$ | | | | | |
| | BR | $9.49781 \times 10^{-10}$ | | | | | |
| | AP | $4.09749$ | | | | | |
| | BP | $-2.00615$ | | | | | |
| 7 | (display plane) | | | (from No. 1 surface) | | | |
| | | | | Y | $-13.70.9$ | θ | 36.717° |
| | | | | Z | 32.348 | | |

$R_{y1}/R_{y2} = 0.57$
$R_{y2}/R_{x2} = 0.74$

Example 10

| 1 | ∞(pupil) | | 20.686 | | | | |
|---|---|---|---|---|---|---|---|
| 2 | 60.659 | | 3.910 | | 1.4870 | | 70.40 |
| | | | | (from Z-axis) | | | |
| | | | | Y | $-1.095$ | θ | $-15.45°$ |
| 3 | $-53.427$ | | | | | | |
| 4 | $R_y$ | $-27.822$ | | | 1.5633 | | 64.15 |
| | $R_x$ | $-147.601$ | | (from No. 1 surface) | | | |
| | $K_y$ | $-9.2496 \times 10^{-1}$ | | Y | 0 | θ | 30.00° |
| | $K_x$ | 0 | | Z | 36.000 | | |
| | AR | $-8.97807 \times 10^{-9}$ | | | | | |
| | BR | $3.07711 \times 10^{-11}$ | | | | | |
| | AP | $1.58667 \times 10$ | | | | | |
| | BP | $-4.11804$ | | | | | |
| 5 | $R_y$ | $-54.141$ | | | 1.5633 | | 64.15 |
| | $R_x$ | $-78.603$ | | (from No. 1 surface) | | | |
| | $K_y$ | 0 | | Y | $-16.961$ | θ | 5.49° |
| | $K_x$ | 0 | | Z | 42.955 | | |
| | AR | $-1.11106 \times 10^{-7}$ | | | | | |
| | BR | $5.80094 \times 10^{-15}$ | | | | | |
| | AP | $1.95015$ | | | | | |
| | BP | $-2.90911 \times 10$ | | | | | |
| 6 | $R_y$ | $-27.822$ | | (from No. 1 surface) | | | |
| | $R_x$ | $-147.601$ | | Y | 0 | θ | 30.00 |
| | $K_y$ | $-9.2496 \times 10^{-1}$ | | Z | 36.000 | | |
| | $K_x$ | 0 | | | | | |
| | AR | $-8.97807 \times 10^{-9}$ | | | | | |
| | BR | $3.07711 \times 10^{-11}$ | | | | | |
| | AP | $1.58667 \times 10$ | | | | | |
| | BP | $-4.11804$ | | | | | |
| 7 | (display plane) | | | (from No. 1 surface) | | | |
| | | | | Y | $-15.418$ | θ | 30.699° |
| | | | | Z | 24.646 | | |

$R_{y1}/R_{y2} = 0.51$
$R_{y2}/R_{x2} = 0.69$

Example 11

| 1 | ∞(pupil) | | 19.865 | | | | |
|---|---|---|---|---|---|---|---|
| 2 | 153.020 | | 4.000 | | 1.4870 | | 70.40 |
| | | | | (from Z-axis) | | | |
| | K | $-287.670$ | | Y | $-0.344$ | θ | $-21.36$ |
| | A | $3.48592 \times 10^{-7}$ | | | | | |
| | B | $-7.86793 \times 10^{-9}$ | | | | | |
| 3 | $-37.717$ | | | | | | |
| 4 | $R_y$ | $-29.433$ | | | 1.5633 | | 64.15 |
| | $R_x$ | ∞ | | (from No. 1 surface) | | | |
| | $K_y$ | $-2.697475$ | | Y | 0 | θ | 30.00° |
| | $K_x$ | 0 | | Z | 35.000 | | |
| | AR | $-1.38537 \times 10^{-8}$ | | | | | |
| | BR | $3.68465 \times 10^{-11}$ | | | | | |
| | AP | $2.35979 \times 10$ | | | | | |
| | BP | $-4.34114$ | | | | | |
| 5 | $R_y$ | $-47.976$ | | | 1.5633 | | 64.15 |
| | $R_x$ | $-81.052$ | | (from No. 1 surface) | | | |
| | $K_y$ | 0 | | Y | $-18.821$ | θ | 1.58 |
| | $K_x$ | 0 | | Z | 41.952 | | |
| | AR | $-7.30519 \times 10^{-7}$ | | | | | |
| | BR | $1.73135 \times 15$ | | | | | |
| | AP | $-9.32438 \times 10^{-1}$ | | | | | |
| | BP | $-6.43587 \times 10$ | | | | | |
| 6 | $R_y$ | $-29.433$ | | (from No. 1 surface) | | | |

-continued

| Surface No. | Radius of curvature | | Surface separation | Refractive index (Eccentricity) | | Abbe's No. (Inclination angle) | |
|---|---|---|---|---|---|---|---|
| | $R_x$ | ∞ | | Y | 0 | θ | 30.00° |
| | $K_y$ | −2.697475 | | Z | 35.000 | | |
| | $K_x$ | 0 | | | | | |
| | AR | $1.38537 \times 10^{-8}$ | | | | | |
| | BR | $3.68465 \times 10^{-11}$ | | | | | |
| | AP | $2.35979 \times 10$ | | | | | |
| | BP | −4.34114 | | | | | |
| 7 | (display plane) | | | (from No. 1 surface) | | | |
| | | | | Y | −14.061 | θ | 29.869° |
| | | | | Z | 24.680 | | |

$R_{y1}/R_{y2} = 0.61$
$R_{y2}/R_{x2} = 0.59$

Example 12

| 1 | ∞(pupil) | | 22.125 | | | | |
|---|---|---|---|---|---|---|---|
| 2 | 211.333 | | | | 1.4870 | | 70.40 |
| | | | | (from Z-axis) | | | |
| | | | | Y | 5.732 | θ | −21.28° |
| 3 | −38.907 | | | (from No. 1 surface) | | | |
| | | | | Y | 3.955 | θ | −10.87° |
| | | | | Z | 25.041 | | |
| 4 | $R_y$ | −28.926 | | | 1.4870 | | 70.40 |
| | $R_x$ | ∞ | | (from No. 1 surface) | | | |
| | $K_y$ | −1.655529 | | Y | 0 | θ | 30.00° |
| | $K_x$ | 0 | | Z | 35.000 | | |
| | AR | $-1.56055 \times 10^{-8}$ | | | | | |
| | BR | $1.68174 \times 10^{-10}$ | | | | | |
| | AP | $1.74304 \times 10$ | | | | | |
| | BP | −2.0870 | | | | | |
| 5 | $R_y$ | −46.424 | | | 1.487 | | 70.4 |
| | $R_x$ | −71.978 | | (from No. 1 surface) | | | |
| | $K_y$ | 0 | | Y | −18.891 | θ | 0.10° |
| | $K_x$ | 0 | | Z | 41.772 | | |
| | AR | $-2.25009 \times 10^{-8}$ | | | | | |
| | BR | $1.09724 \times 10^{-15}$ | | | | | |
| | AP | −4.13001 | | | | | |
| | BP | $-6.40157 \times 10$ | | | | | |
| 6 | $R_y$ | −28.926 | | (from No. 1 surface) | | | |
| | $R_x$ | ∞ | | Y | 0 | θ | 30.00° |
| | $K_y$ | −1.655529 | | Z | 35.000 | | |
| | $K_x$ | 0 | | | | | |
| | AR | $-1.56055 \times 10^{-8}$ | | | | | |
| | BR | $1.68174 \times 10^{-10}$ | | | | | |
| | AP | $1.74304 \times 10$ | | | | | |
| | BP | −2.08703 | | | | | |
| 7 | (display plane) | | | (from No. 1 surface) | | | |
| | | | | Y | −13.686 | θ | 28.515° |
| | | | | Z | 24.461 | | |

$R_{y1}/R_{y2} = 0.62$
$R_{y2}/R_{x2} = 0.64$

Example 13

| 1 | ∞(pupil) | | 22.000 | | | | |
|---|---|---|---|---|---|---|---|
| 2 | 79.298 | | 6.000 | | 1.6200 | | 60.30 |
| | | | | (from Z-axis) | | | |
| | | | | Y | −3.096 | θ | −15.00° |
| 3 | −39.864 | | 1.000 | | 1.7550 | | 27.60 |
| 4 | −57.753 | | | | | | |
| 5 | $R_y$ | −28.332 | | | 1.5633 | | 64.15 |
| | | | | (from No. 1 surface) | | | |
| | $K_y$ | $-2.14084 \times 10^{-1}$ | | Y | −9.567 | θ | 15.00° |
| | $K_x$ | 0 | | Z | 46.148 | | |
| | AR | $2.67938 \times 10^{-6}$ | | | | | |
| | BR | $-2.14615 \times 10^{-9}$ | | | | | |
| | AP | $4.32917 \times 10^{-1}$ | | | | | |
| | BP | $5.86993 \times 10^{-1}$ | | | | | |
| 6 | $R_y$ | −39.619 | 0 | | 1.5633 | | 64.15 |
| | $R_x$ | −67.799 | | (from No. 1 surface) | | | |
| | $K_y$ | 0 | | Y | −20.032 | θ | 0.98° |
| | $K_x$ | 0 | | Z | 50.073 | | |
| | AR | $2.14587 \times 10^{-6}$ | | | | | |
| | BR | $-3.20475 \times 10^{-10}$ | | | | | |
| | AP | $-1.39488 \times 10^{-1}$ | | | | | |
| | BP | $-9.57286 \times 10^{-1}$ | | | | | |
| 7 | $R_y$ | −28.332 | | (from No. 1 surface) | | | |
| | $R_x$ | ∞ | | Y | −9.567 | θ | 15.00° |

-continued

| Surface No. | Radius of curvature | | Surface separation | Refractive index (Eccentricity) | | Abbe's No. (Inclination angle) | |
|---|---|---|---|---|---|---|---|
| | $K_y$ | $-2.14084 \times 10^{-1}$ | | Z | 46.148 | | |
| | $K_x$ | 0 | | | | | |
| | AR | $2.67938 \times 10^{-6}$ | | | | | |
| | BR | $2.14615 \times 10^{-9}$ | | | | | |
| | AP | $4.32917 \times 10^{-1}$ | | | | | |
| | BP | $5.86993 \times 10^{-1}$ | | | | | |
| 8 | (display plane) | | | (from No. 1 surface) | | | |
| | | | | Y | $-16.158$ | θ | 37.542° |
| | | | | Z | 34.338 | | |

$R_{y1}/R_{y2} = 0.72$
$R_{y2}/R_{x2} = 0.58$

Example 14

| 1 | ∞(pupil) | | 37.534 | | | | |
|---|---|---|---|---|---|---|---|
| 2 | ∞ | | | | 1.5633 | | 64.15 |
| | | | | (from Z-axis) | | | |
| | | | | Y | 0 | θ | 31.31° |
| 3 | $-71.813$ | | | | 1.5633 | | 64.15 |
| | | | | (from No. 1 surface) | | | |
| | | | | Y | $-14.754$ | θ | 8.97° |
| | | | | Z | 46.891 | | |
| 4 | ∞ | | | (from No. 1 surface) | | | |
| | | | | Y | 0 | θ | 31.31° |
| | | | | Z | 37.534 | | |
| 5 | (display plane) | | | (from No. 1 surface) | | | |
| | | | | Y | $-11.946$ | θ | 18.429° |
| | | | | Z | 21.500 | | |

$R_{y1}/R_{y2} = \infty$
$R_{y2}/R_{x2} = 1$

Example 15

| 1 | ∞(pupil) | | | | | | |
|---|---|---|---|---|---|---|---|
| 2 | $R_y$ | $-85.98$ | | | 1.5163 | | 64.15 |
| | $R_x$ | $-91.46$ | | (from No. 1 surface) | | | |
| | $K_y$ | 0 | | Y | 2.01 | θ | $-15.60°$ |
| | $K_x$ | 0 | | Z | 74.90 | | |
| | AR | $1.20482 \times 10^{-8}$ | | | | | |
| | BR | $1.12764 \times 10^{-10}$ | | | | | |
| | AP | $-7.71054 \times 10^{-}$ | | | | | |
| | BP | $3.41787 \times 10^{-1}$ | | | | | |
| 3 | $R_y$ | $-96.48$ | | | 1.5163 | | 64.15 |
| | $R_x$ | $-93.62$ | | (from No. 1 surface) | | | |
| | $K_y$ | 0 | | Y | $-23.60$ | θ | $-31.04°$ |
| | $K_x$ | 0 | | Z | 73.96 | | |
| | AR | $3.72286 \times 10^{-13}$ | | | | | |
| | BR | $-3.64045 \times 10^{-12}$ | | | | | |
| | AP | $4.53222 \times 10^{1}$ | | | | | |
| | BP | $-1.13016$ | | | | | |
| 4 | $R_y$ | $-85.98$ | | (from No. 1 surface) | | | |
| | $R_x$ | $-91.46$ | | Y | 2.01 | θ | $-15.60°$ |
| | $K_y$ | 0 | | Z | 74.90 | | |
| | $K_x$ | 0 | | | | | |
| | AR | $1.20482 \times 10^{-8}$ | | | | | |
| | BR | $1.12764 \times 10^{-10}$ | | | | | |
| | AP | $-7.71054 \times 10^{-1}$ | | | | | |
| | BP | $3.41787 \times 10^{-1}$ | | | | | |
| 5 | (display plane) | | | (from No. 1 surface) | | | |
| | | | | Y | 25.00 | θ | $-5.37°$ |
| | | | | Z | 42.25 | | |

$R_{y1}/R_{y2} = 0.891$
$R_{y2}/R_{x2} = 1.0306$
$θ_1 = 16.99°$
$θ_2 = 10.45°$
$θ_3 = 12.13°$
$θ_1/θ_3 = 1.401$

Example 16

| 1 | ∞(pupil) | | | | | | |
|---|---|---|---|---|---|---|---|
| 2 | $R_y$ | $-79.43$ | | | 1.5163 | | 64.15 |
| | $R_x$ | $-102.22$ | | (from No. 1 surface) | | | |
| | K | 0 | | Y | $-8.12$ | θ | $-22.15°$ |
| | A | $1.7867 \times 10^{-6}$ | | Z | 34.57 | | |
| | B | $4.10658 \times 10^{-11}$ | | | | | |
| 3 | $R_y$ | $-103.44$ | | | 1.5163 | | 64.15 |
| | $R_x$ | $-96.43$ | | (from No. 1 surface) | | | |
| | K | 0 | | Y | $-34.60$ | θ | $-37.01°$ |

-continued

| Surface No. | Radius of curvature | | Surface separation | Refractive index (Eccentricity) | | Abbe's No. (Inclination angle) | |
|---|---|---|---|---|---|---|---|
| | A | $1.88097 \times 10^{-8}$ | | Z | 62.34 | | |
| | B | $-1.38565 \times 10^{-13}$ | | | | | |
| 4 | $R_y$ | -79.43 | | (from No. 1 surface) | | | |
| | $R_x$ | -102.22 | | Y | 34.57 | θ | -22.15° |
| | K | 0 | | Z | -8.12 | | |
| | A | $1.7867 \times 10^{-6}$ | | | | | |
| | B | $4.10658 \times 10^{-11}$ | | | | | |
| 5 | (display plane) | | | (from No. 1 surface) | | | |
| | | | | Y | 25.00 | θ | -6.01° |
| | | | | Z | 33.00 | | |

$R_{y1}/R_{y2} = 0.768$
$R_{y2}/R_{x2} = 1.0726$
$\theta_1 = 16.21°$
$\theta_2 = 12.36°$
$\theta_3 = 20.46°$
$\theta_1/\theta_3 = 0.792$

Example 17

| Surface No. | Radius of curvature | | Surface separation | Refractive index (Eccentricity) | | Abbe's No. (Inclination angle) | |
|---|---|---|---|---|---|---|---|
| 1 | ∞(pupil) | | | | | | |
| 2 | $R_y$ | -83.15 | | | 1.5163 | | 64.15 |
| | $R_x$ | 77.38 | | (from No. 1 surface) | | | |
| | $K_y$ | 0 | | Y | -1.81 | θ | -32.39° |
| | $K_x$ | 0 | | Z | 24.37 | | |
| | AR | $0.163350 \times 10^{-5}$ | | | | | |
| | BR | $0.413058 \times 10^{-14}$ | | | | | |
| | AP | 0.488809 | | | | | |
| | BP | $-0.233043 \times 10^3$ | | | | | |
| 3 | $R_y$ | -50.17 | | | 1.5163 | | 64.15 |
| | $R_x$ | -85.97 | | (from No. 1 surface) | | | |
| | $K_y$ | 0 | | Y | -27.79 | θ | -66.03° |
| | $K_x$ | 0 | | Z | 14.10 | | |
| | AR | $0.351273 \times 10^{-10}$ | | | | | |
| | BR | $-0.171172 \times 10^{-12}$ | | | | | |
| | AP | $-0.172816 \times 10^3$ | | | | | |
| | BP | $0.647446 \times 10^{-1}$ | | | | | |
| 4 | $R_y$ | -83.15 | | (from No. 1 surface) | | | |
| | $R_x$ | 77.38 | | Y | -1.81 | θ | -32.39° |
| | $K_y$ | 0 | | Z | 24.37 | | |
| | $K_x$ | 0 | | | | | |
| | AR | $0.163350 \times 10^{-5}$ | | | | | |
| | BR | $0.413058 \times 10^{-14}$ | | | | | |
| | AP | 0.488809 | | | | | |
| | BP | $-0.233043 \times 10^{-3}$ | | | | | |
| 5 | (display plane) | | | (from No. 1 surface) | | | |
| | | | | Y | 15.00 | θ | -29.24° |
| | | | | Z | 25.00 | | |

$R_{y1}/R_{y2} = 1.657$
$R_{y2}/R_{x2} = 0.5836$
$\theta_1 = 30.93°$
$\theta_2 = 16.92°$
$\theta_3 = 21.79°$
$\theta_1/\theta_3 = 1.419$

Example 18

| Surface No. | Radius of curvature | | Surface separation | Refractive index (Eccentricity) | | Abbe's No. (Inclination angle) | |
|---|---|---|---|---|---|---|---|
| 1 | ∞(pupil) | | | | | | |
| 2 | $R_y$ | -92.41 | | | 1.5163 | | 64.15 |
| | $R_x$ | -95.08 | | (from No. 1 surface) | | | |
| | $K_y$ | 0 | | Y | 1.66 | θ | -15.97° |
| | $K_x$ | 0 | | Z | 77.36 | | |
| | AR | $1.25939 \times 10^{-}$ | | | | | |
| | BR | $9.92316 \times 10^{-11}$ | | | | | |
| | AP | $-7.86808 \times 10^{-1}$ | | | | | |
| | BP | $3.10363 \times 10^{-1}$ | | | | | |
| 3 | $R_y$ | -93.58 | | | 1.5163 | | 64.15 |
| | $R_x$ | -89.78 | | (from No. 1 surface) | | | |
| | $K_y$ | 0 | | Y | -6.90 | θ | -21.13° |
| | $K_x$ | 0 | | Z | 76.11 | | |
| | AR | $2.0381 \times 10^{-17}$ | | | | | |
| | BR | $-1.13394 \times 10^{-12}$ | | | | | |
| | AP | $-1.25783 \times 10^4$ | | | | | |
| | BP | -2.43821 | | | | | |
| 4 | $R_y$ | -92.41 | | (from No. 1 surface) | | | |
| | $R_x$ | -95.08 | | Y | 1.66 | θ | -15.97° |
| | $K_y$ | 0 | | Z | 77.36 | | |
| | $K_x$ | 0 | | | | | |
| | AR | $1.25939 \times 10^{-8}$ | | | | | |

-continued

| Surface No. | Radius of curvature | | Surface separation | Refractive index (Eccentricity) | Abbe's No. (Inclination angle) |
|---|---|---|---|---|---|
| | BR | $9.92316 \times 10^{-11}$ | | | |
| | AP | $-7.86808 \times 10^{-1}$ | | | |
| | BP | $3.10363 \times 10^{-1}$ | | | |
| 5 | (display plane) | | | (from No. 1 surface) | |
| | | | | Y  25.00 | θ  −5.35 |
| | | | | Z  40.03 | |

$R_{y1}/R_{y2} = 0.988$
$R_{y2}/R_{x2} = 1.0424$
$\theta_1 = 17.05°$
$\theta_2 = 10.87°$
$\theta_3 = 10.98°$
$\theta_1/\theta_3 = 1.556$ Example 19

| Surface No. | Radius of curvature | | Surface separation | Refractive index (Eccentricity) | Abbe's No. (Inclination angle) |
|---|---|---|---|---|---|
| 1 | ∞(pupil) | | | | |
| 2 | $R_y$ | −76.49 | | 1.5163 | 64.15 |
| | $R_x$ | −61.44 | | (from No. 1 surface) | |
| | $K_y$ | 0 | | Y  7.21 | θ  −11.13° |
| | $K_x$ | 0 | | Z  56.62 | |
| | AR | $-2.16024 \times 10^{-10}$ | | | |
| | BR | $5.10370 \times 10^{-10}$ | | | |
| | AP | $-1.56237 \times 10^{-1}$ | | | |
| | BP | $1.80284 \times 10^{-2}$ | | | |
| 3 | $R_y$ | −106.25 | | 1.5163 | 64.15 |
| | $R_x$ | −95.00 | | (from No. 1 surface) | |
| | $K_y$ | 0 | | Y  −7.11 | θ  −17.91 |
| | $K_x$ | 0 | | Z  88.15 | |
| | AR | $-1.86894 \times 10^{-16}$ | | | |
| | BR | $-1.10252 \times 10^{-16}$ | | | |
| | AP | $7.00281 \times 10^{-3}$ | | | |
| | BP | $-5.54612 \times 10^{-1}$ | | | |
| 4 | $R_y$ | −76.49 | | (from No. 1 surface) | |
| | $R_x$ | −61.44 | | Y  7.21 | θ  −11.13° |
| | $K_y$ | 0 | | Z  56.62 | |
| | $K_x$ | 0 | | | |
| | AR | $-2.16024 \times 10^{-10}$ | | | |
| | BR | $5.10370 \times 10^{-10}$ | | | |
| | AP | $-1.56237 \times 10^{-1}$ | | | |
| | BP | $1.80284 \times 10^{-2}$ | | | |
| 5 | (display plane) | | | (from No. 1 surface) | |
| | | | | Y  25.00 | θ  0.00° |
| | | | | Z  39.71 | |

$R_{y1}/R_{y2} = 0.720$
$R_{y2}/R_{x2} = 1.1185$
$\theta_1 = 16.69°$
$\theta_2 = 10.09°$
$\theta_3 = 18.47°$
$\theta_1/\theta_3 = 0.904$ It should be noted that the image display apparatus in any of the above Examples of the present invention can be readily adapted for various eye reliefs and various image display device sizes by coefficient-multiplying the constituent parameters of the Example.

Figure 7:
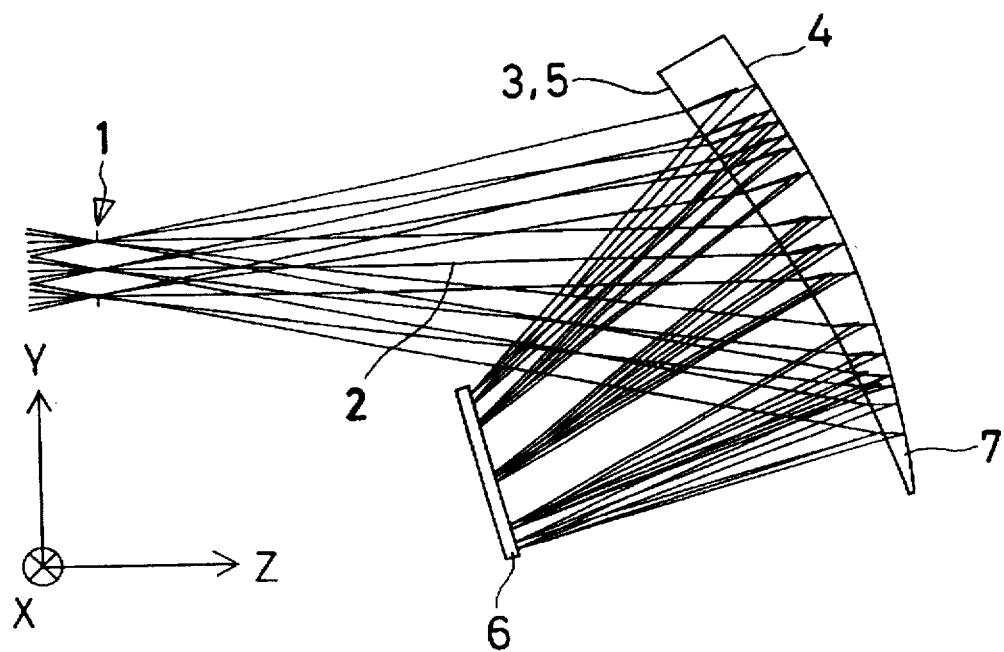
FIG. 7 is a sectional view of an image display apparatus according to Example 7 of the present invention.
Figure 8:
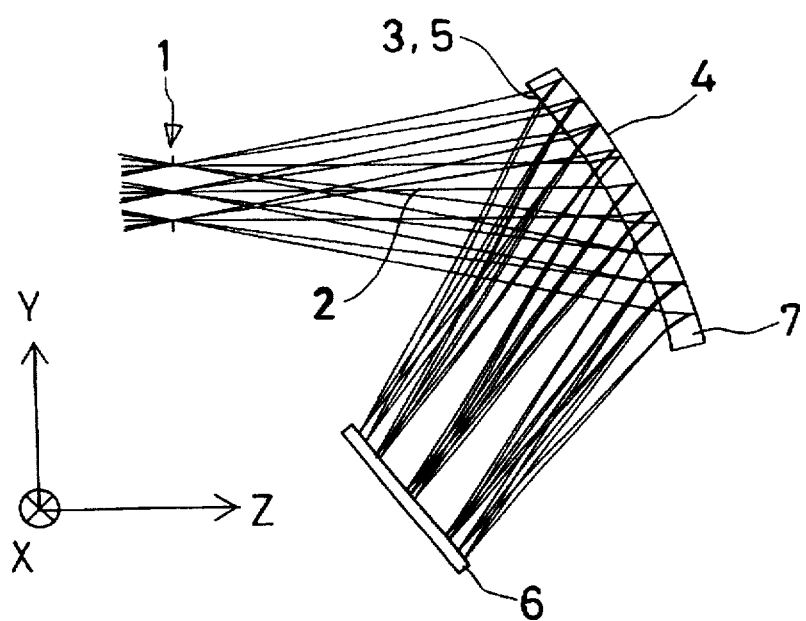
FIG. 8 is a sectional view of an image display apparatus according to Example 8 of the present invention.
Figure 9:
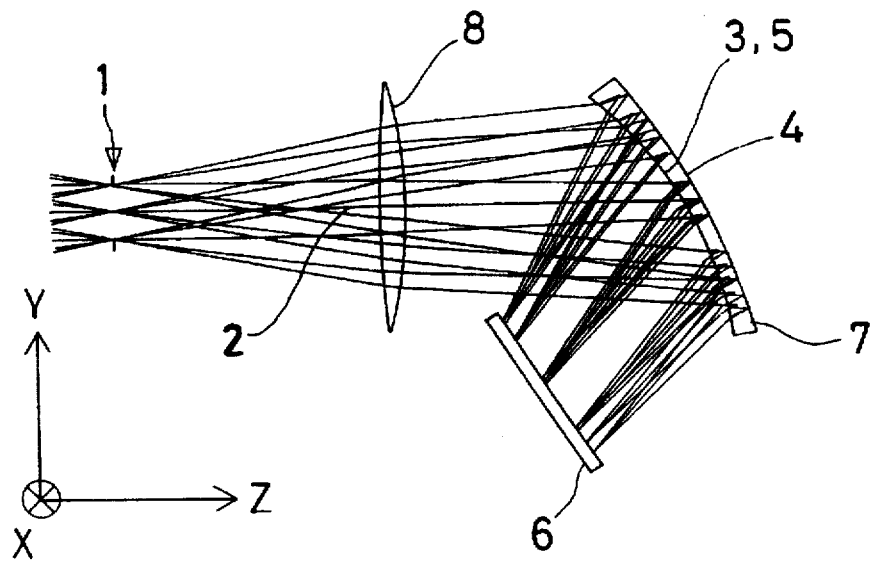
FIG. 9 is a sectional view of an image display apparatus according to Example 9 of the present invention.
Figure 10:
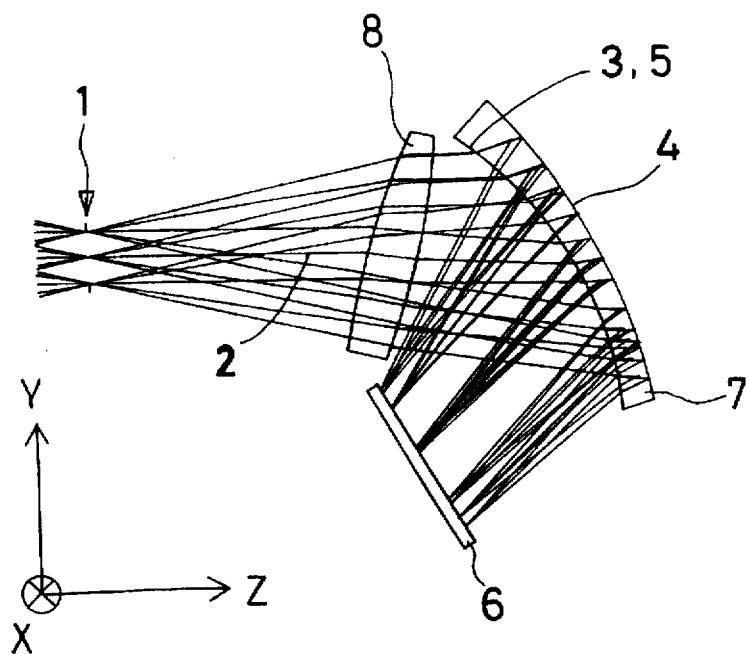
FIG. 10 is a sectional view of an image display apparatus according to Example 10 of the present invention.
Figure 11:
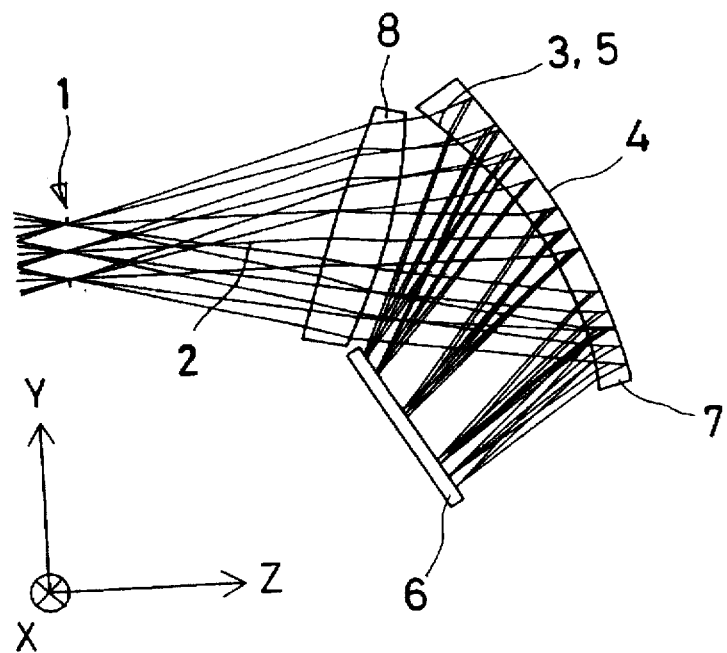
FIG. 11 is a sectional view of an image display apparatus according to Example 11 of the present invention.
Figure 12:
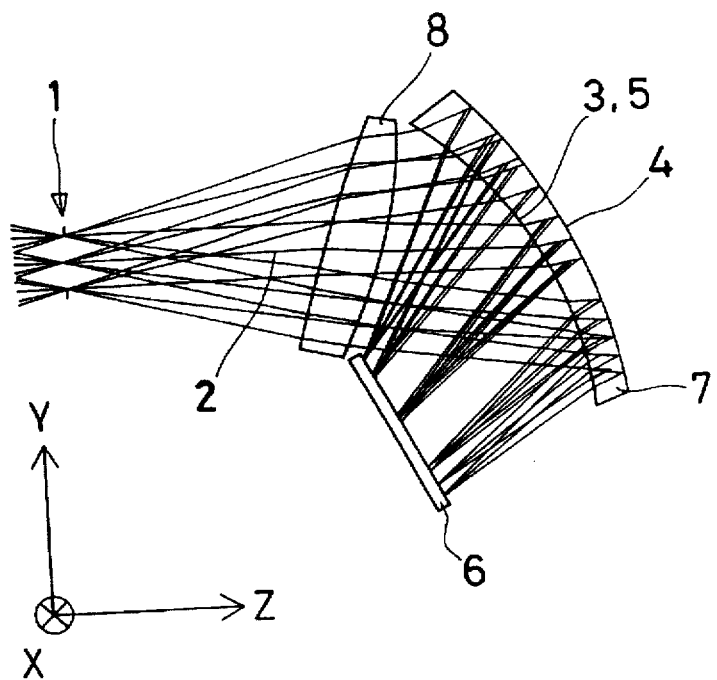
FIG. 12 is a sectional view of an image display apparatus according to Example 12 of the present invention.
Figure 13:
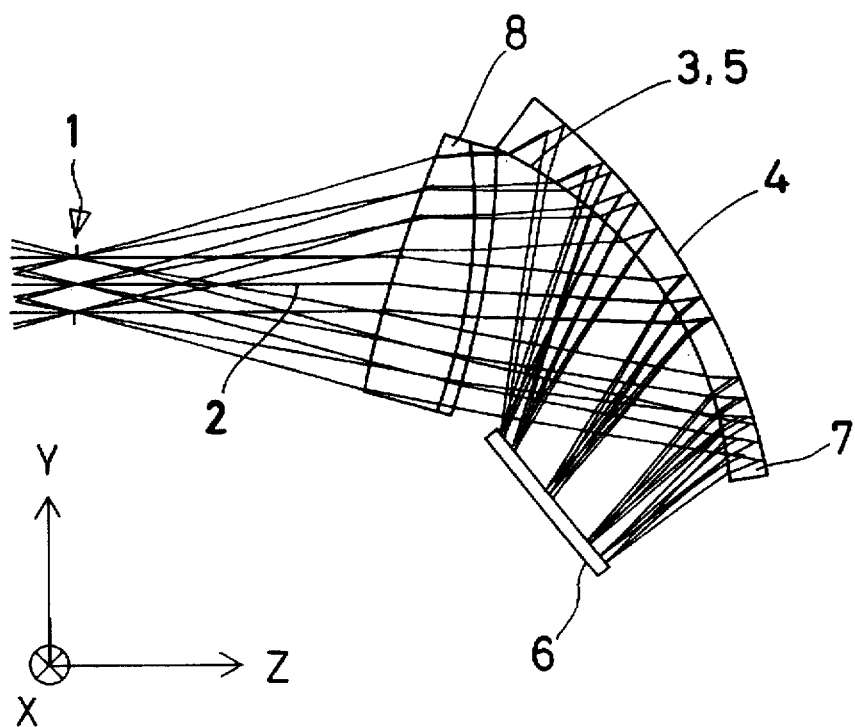
FIG. 13 is a sectional view of an image display apparatus according to Example 13 of the present invention.
Figure 14:
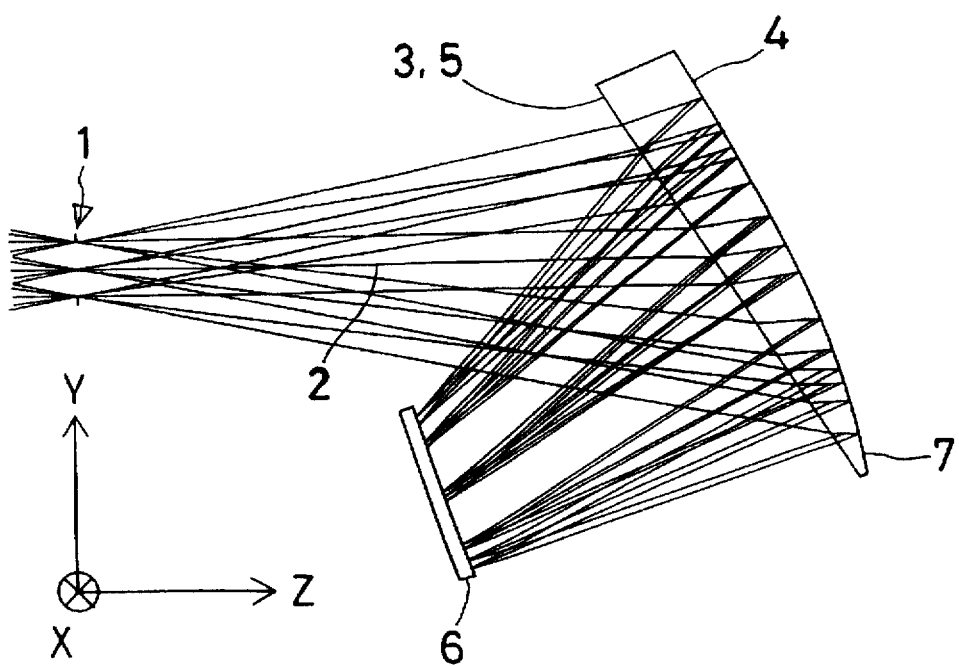
FIG. 14 is a sectional view of an image display apparatus according to Example 14 of the present invention.
Figure 15:
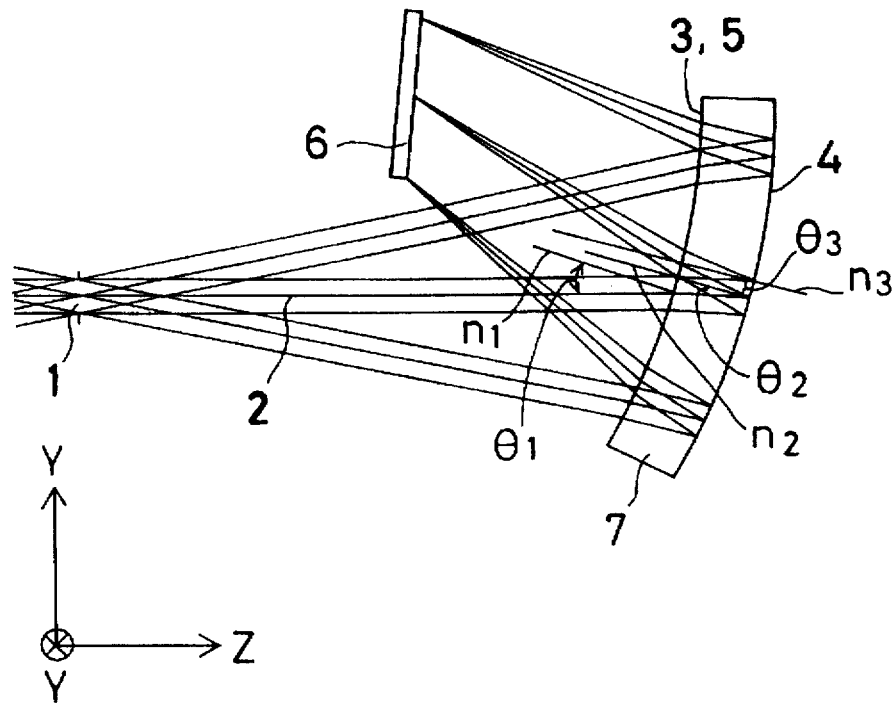
FIG. 15 is a sectional view of an image display apparatus according to Example 15 of the present invention.
Figure 16:
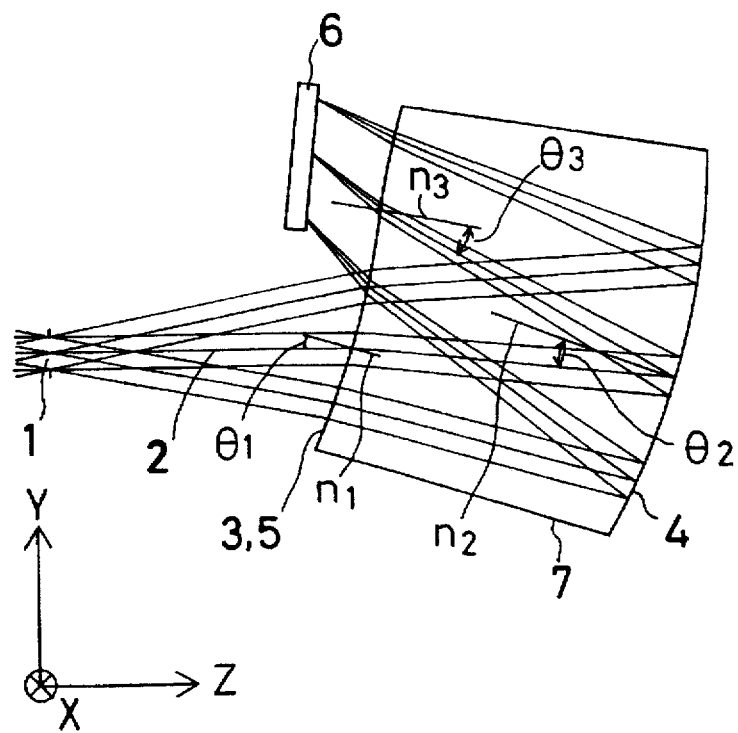
FIG. 16 is a sectional view of an image display apparatus according to Example 16 of the present invention.
Figure 17:
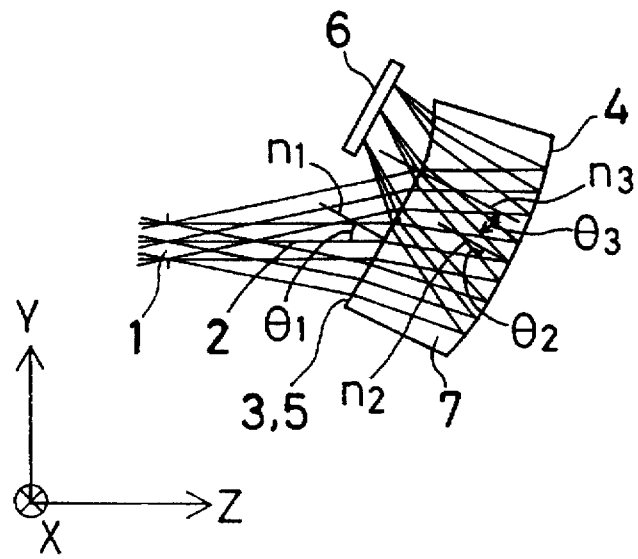
FIG. 17 is a sectional view of an image display apparatus according to Example 17 of the present invention.
Figure 18:
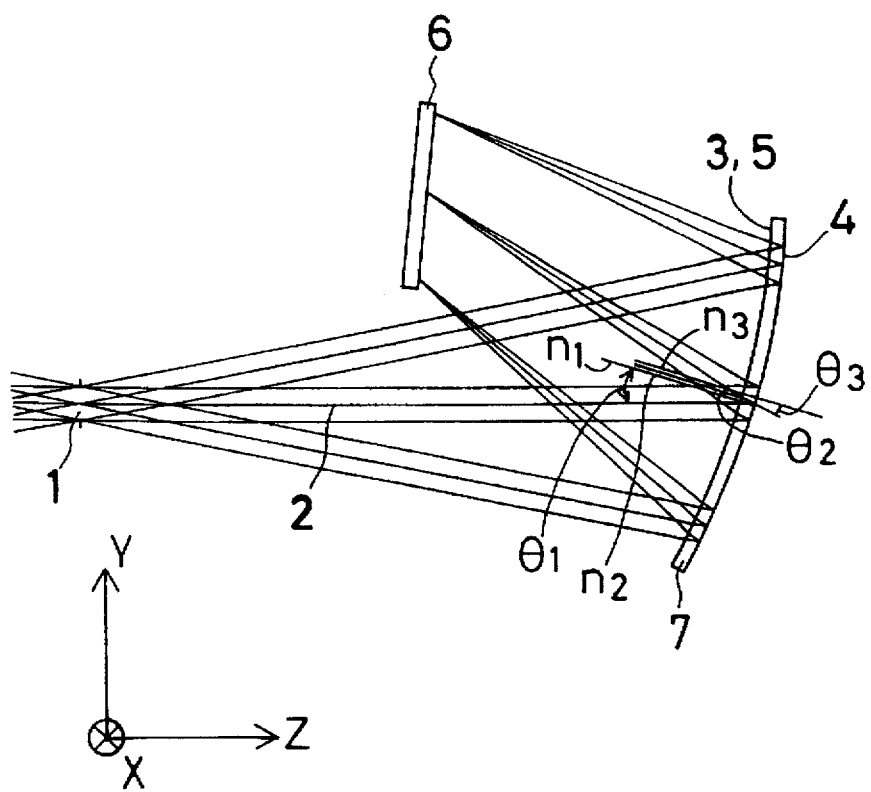
FIG. 18 is a sectional view of an image display apparatus according to Example 18 of the present invention.
Figure 19:
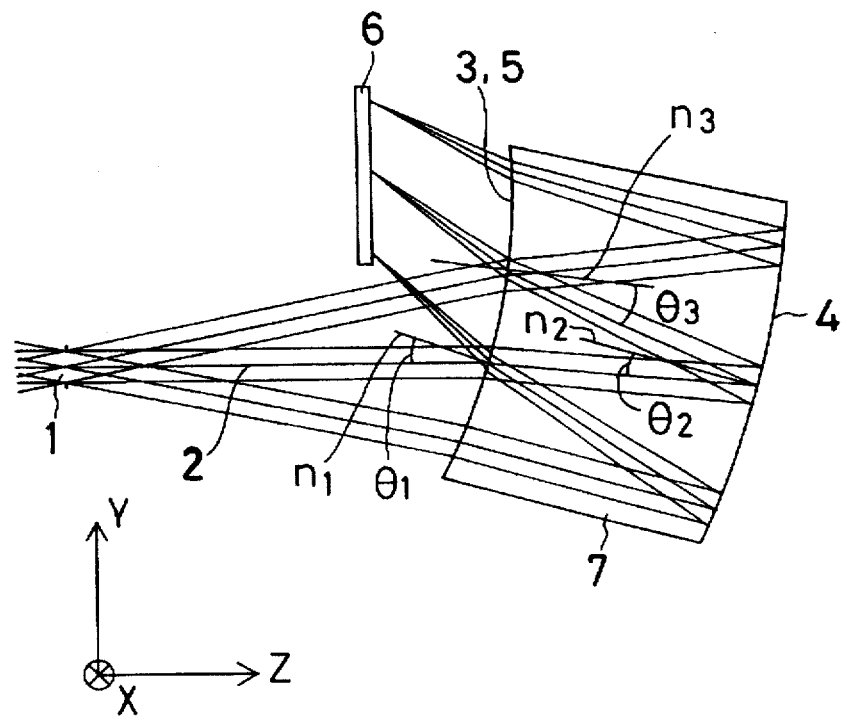
FIG. 19 is a sectional view of an image display apparatus according to Example 19 of the present invention.
Figure 22A:
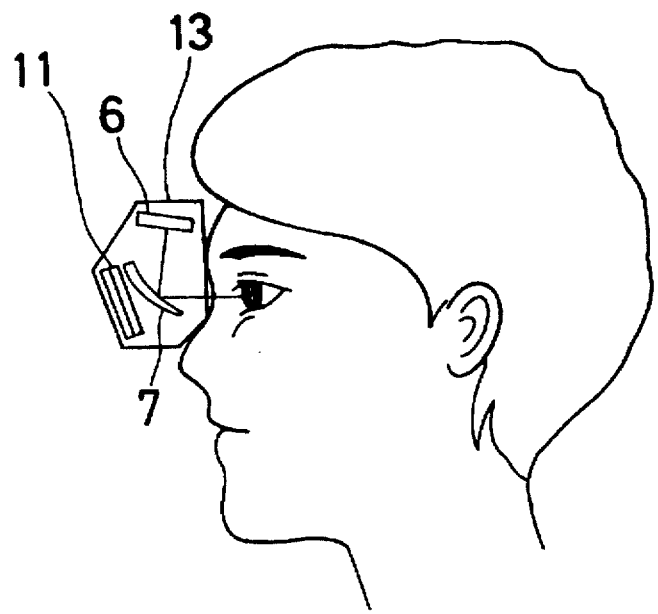
FIGS. 22(a) and 22(b) are sectional and perspective views of a head-mounted image display apparatus according to the present invention.
Figure 22B:
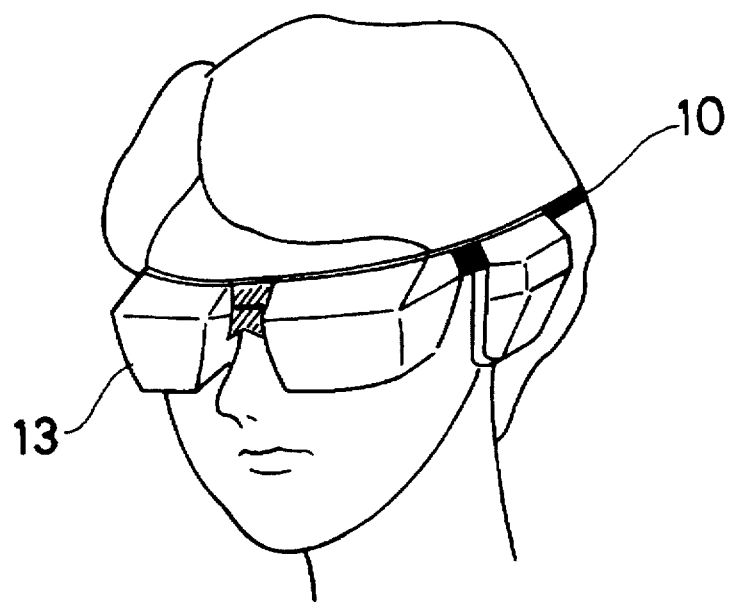
Figure 23:
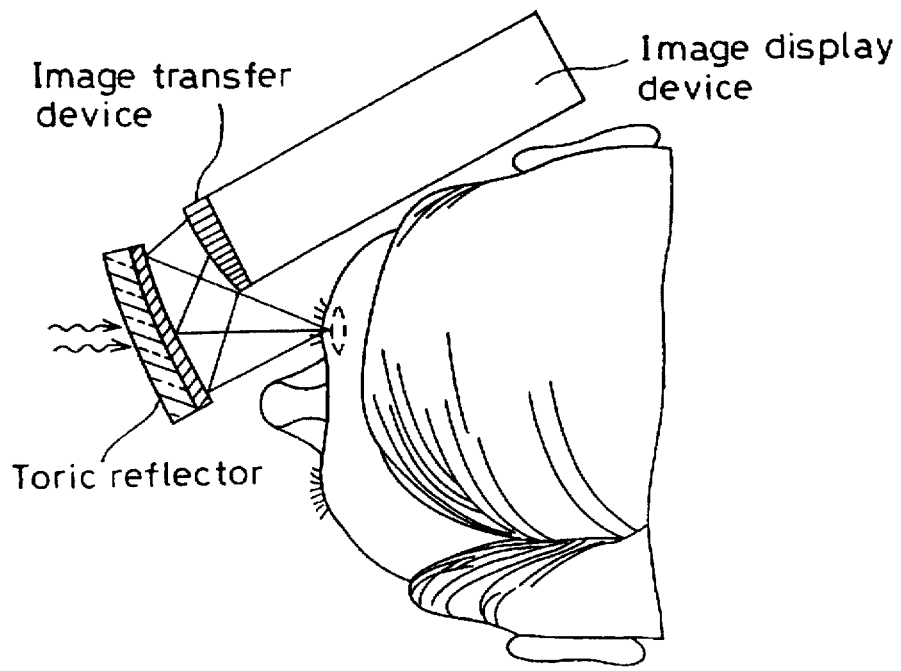
FIG. 23 shows the optical system of a conventional image display apparatus.
Figure 24:
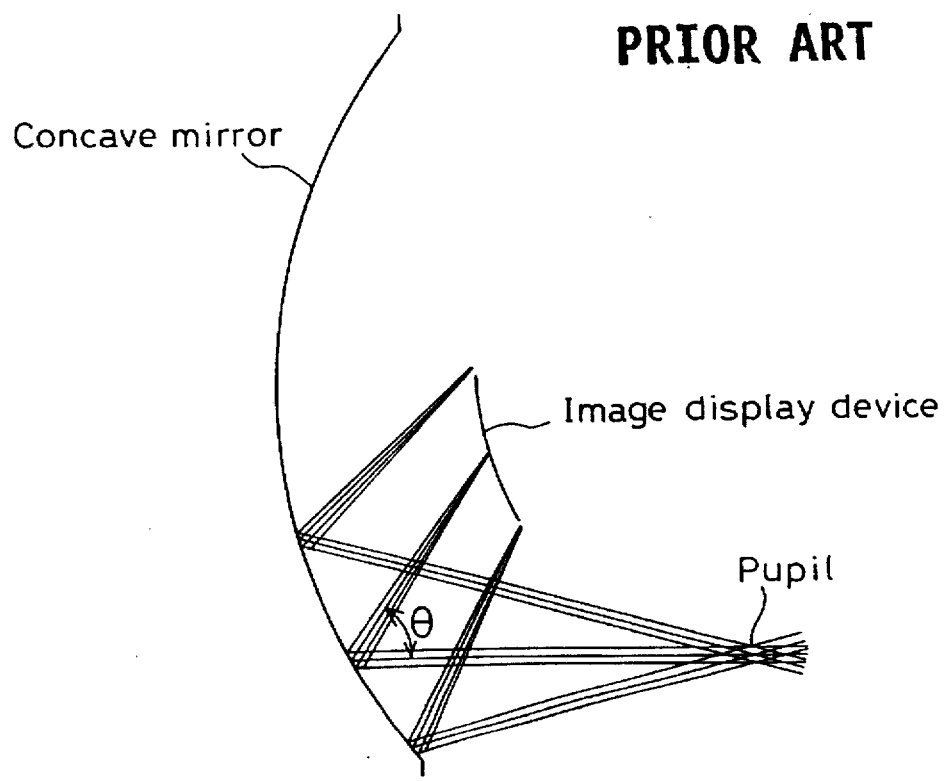
FIG. 24 shows the optical system of another conventional image display apparatus.
Figure 25:
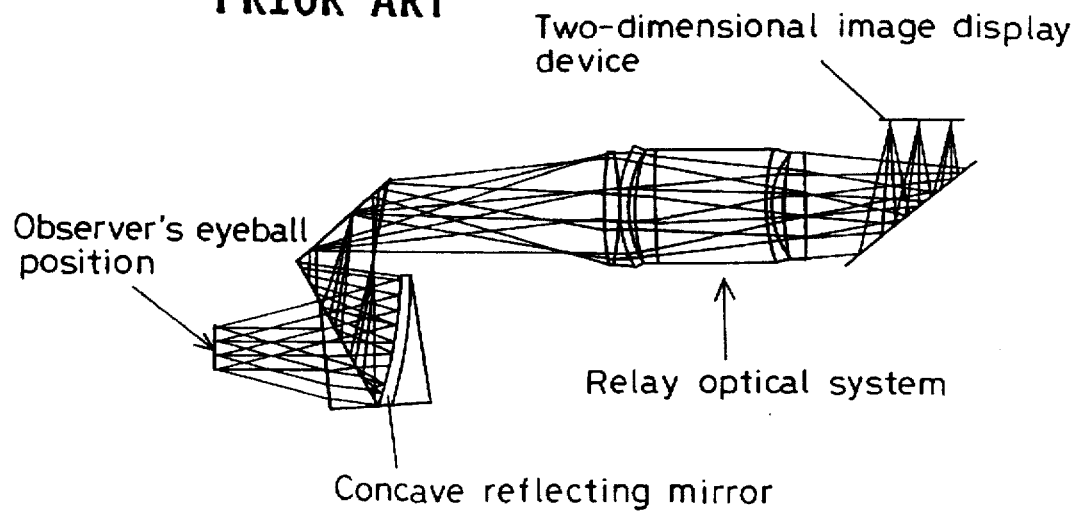
FIG. 25 shows the optical system of still another conventional image display apparatus.
Figure 26:
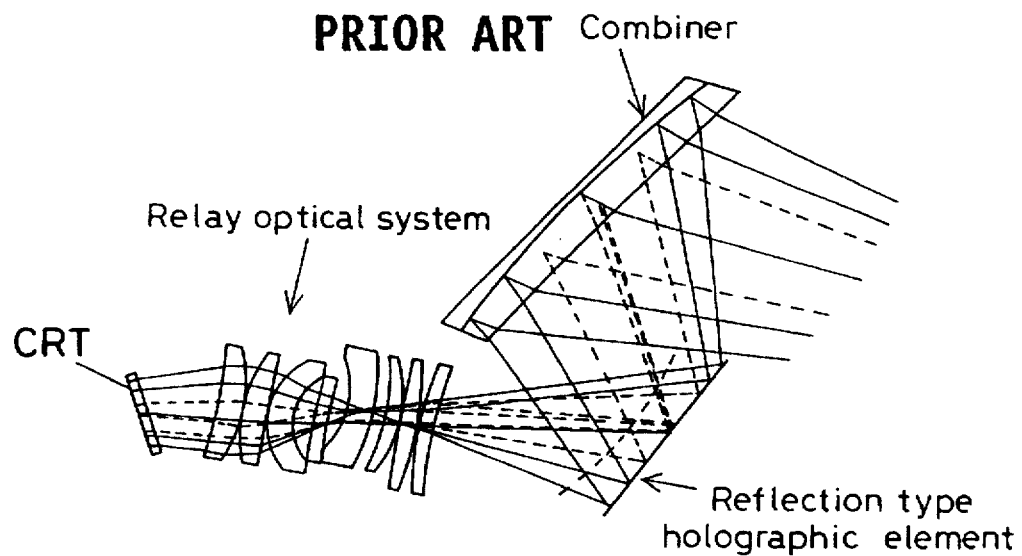
FIG. 26 shows the optical system of a further conventional image display apparatus.
Figure 27A:
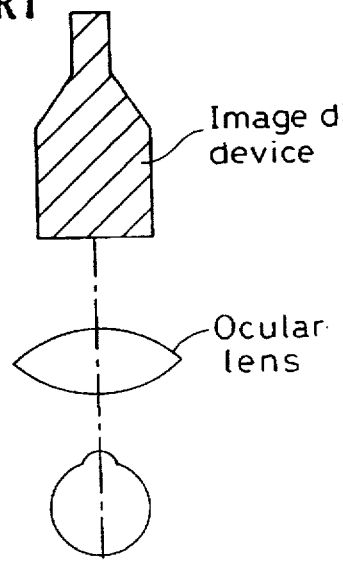
FIGS. 27(a) and 27(b) show the optical system of a still further conventional image display apparatus.
Figure 27B:
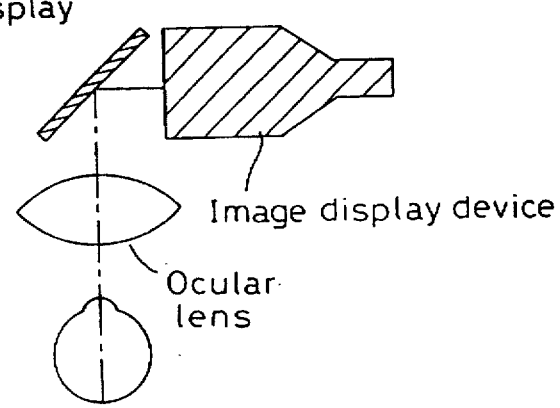

Although the image display apparatus of the present invention has been described by way of Examples, it should be noted that the present invention is not necessarily limited to these Examples, and that various changes and modifications may be imparted thereto. For example, the image display apparatus of the present invention may be arranged in the form of a head-mounted image display apparatus (HMD) as shown in FIG. 22(a), which is a sectional view, and in FIG. 22(b), which is a perspective view. In this case, a pair of left and right HMDs 13 are fixedly supported with the distance therebetween matched with the interpupillary distance (i.e. the distance between the left and right eyes), and a headband 10, for example, is attached to the HMDs 13. In actual use, the observer wears the system on his/her head by using the headband 10. In this example of use, each HMD 13 may be arranged such that the reflecting surface of the concave mirror or the back-coated mirror in the ocular optical system is formed by using a semitransparent mirror (half-mirror), and a liquid crystal shutter 11 is provided in front of the half-mirror, thereby enabling an outside world image to be selectively observed or superimposed on the image of the image display device by opening the shutter 11. Although in the arrangement shown in FIG. 22(a) the ocular optical system arranged according to the second aspect of the present invention, as shown in FIG. 7, is used, it should be noted that the ocular optical system arranged according to the first aspect of the present invention, as shown in FIGS. 1 to 6, is also usable.

As will be clear from the foregoing description, the present invention makes it possible to provide an image display apparatus which enables observation of an image of high resolution by satisfactorily correcting field curvature and other aberrations simultaneously in a compact optical system which transmits an image to an observer's eyeball without forming an intermediate image. Further, it is possible to provide an image display apparatus which enables observation of a favorable image at a wide field angle, and which is extremely small in size and light in weight.

What we claim is:

1. An image display apparatus, comprising:
   an image display device for displaying an image; and
   an optical system for projecting an image formed by said image display device without forming an intermediate image and for leading the projected image to an observer's eyeball,
   said optical system including at least one concave mirror having a rotationally asymmetric reflecting surface which is concave toward the observer's eyeball and decentered with respect to an optical axis, and at least one optical element of positive refractive power which is disposed between said concave mirror and said image display device,
   wherein a focal length of said optical system and a focal length of said optical element of positive refractive power satisfy the following condition:

$$1 < f_y/f_{yO} < 5 \text{ or } 1 < f_x/f_{xO} < 5$$

where $f_y$ and $f_x$ are focal lengths in Y- and X-axis directions, respectively, of said optical element of positive refractive power, and $f_{yO}$ and $f_{xO}$ are focal lengths in the Y- and X-axis directions, respectively, of the entire optical system, wherein a direction of an optical axis incident on an observer's pupil is defined as a Z-axis direction, a Y-axis is defined so that decentration of said concave mirror is made in a YZ-plane, and an X-axis is defined so as to intersect both the Y- and Z-axes at right angles.

2. An image display apparatus according to claim 1, wherein said optical element of positive refractive power has at least one surface which is decentered with respect to the optical axis.

3. An image display apparatus according to any one of claims 1 to 2, wherein a focal length of said optical system and a focal length of said optical element of positive refractive power satisfy the following condition:

$$1.1 < f_y/f_{yO} < 2.5 \text{ or } 1.1 < f_{xO}/f_{xO} < 2.5$$

where $f_y$ and $f_x$ are focal lengths in Y- and X-axis directions, respectively, of said optical element of positive refractive power, and $f_{yO}$ and $f_{xO}$ are focal lengths in the Y- and X-axis directions, respectively, of the entire optical system, wherein a direction of an optical axis incident on an observer's pupil is defined as a Z-axis direction, a Y-axis is defined so that decentration of said concave mirror is made in a YZ-plane, and an X-axis is defined so as to intersect both the Y- and Z-axes at right angles.

4. An image display apparatus according to claim 1, wherein said optical element of positive refractive power is a positive meniscus lens having a concave surface directed toward said image display device.

5. An image display apparatus according to claim 1, wherein said optical element of positive refractive power is a cemented positive lens.

6. An image display apparatus according claim 1, wherein said concave mirror is a back-coated mirror.

7. An image display apparatus, comprising:
   an image display device for displaying an image; and
   an optical system for projecting an image formed by said image display device without forming an intermediate image and for leading the projected image to an observer's eyeball,
   said optical system including at least one concave mirror having a rotationally asymmetric reflecting surface which is concave toward the observer's eyeball and decentered with respect to an optical axis, and at least one optical element of positive refractive power which is disposed between said concave mirror and said image display device,
   said concave mirror is a backed-coated mirror, and
   said image display apparatus satisfies the following condition:

$$R_{y1}/R_{y2} < 2$$

where $R_{y1}$ is a curvature radius of a transmitting surface of said back-coated mirror in a plane containing both said observer's visual axis and a center of said image display device, and $R_{y2}$ is a curvature radius of a reflecting surface of said back-coated mirror in said plane.

8. An image display apparatus according to claim 7, which satisfies the following condition:

$$R_{y1}/R_{y2} < 1$$

where $R_{y1}$ is a curvature radius of a transmitting surface of said back-coated mirror in a plane containing both said observer's visual axis and a center of said image display device, and $R_{y2}$ is a curvature radius of a reflecting surface of said back-coated mirror in said plane.

9. An image display apparatus according to claim 7, which satisfies the following condition:

$$R_{y1}/R_{y2} < 0.8$$

where $R_{y1}$ is a curvature radius of a transmitting surface of said back-coated mirror in a plane containing both said observer's visual axis and a center of said image display device, and $R_{y2}$ is a curvature radius of a reflecting surface of said back-coated mirror in said plane.

10. An image display apparatus, comprising:
    an image display device for displaying an image; and
    an ocular optical system for projecting an image formed by said image display device and for leading the projected image to an observer's eyeball,
    said ocular optical system having at least a first surface and a second surface, said first surface is disposed closer to the observer's eyeball than said second surface, a space between the first and second surfaces being filled with a medium having a refractive index n larger than 1 (n>1), said first and second surfaces being decentered in the same direction with respect to an observer's visual axis defined according to when the observer sees a center of the projected image, said second surface being a curved reflecting or semitransparent surface which is concave toward the observer's eyeball, said first and second surfaces having different curvatures, and said first and second surfaces being arranged such that light rays emanating from said image display device are refracted by said first surface and then reflected by said second surface, and the reflected light rays are further refracted by said first surface, thereby allowing a first-order image of said image display device formed by said ocular optical system to enter the observer's eyeball, and
    said image display apparatus satisfies the following condition:

$$R_{y1}/R_{y2} < 2$$

where $R_{y1}$ is a curvature radius of the first surface of said ocular optical system in a plane containing both said observer's visual axis and a center of said image display device, and $R_{y2}$ is a curvature radius of the second surface of said ocular optical system in said plane.

11. An image display apparatus according to claim 10, wherein light rays emanating from said image display device are projected directly into the observer's eyeball.

12. An image display apparatus according to claim 10, wherein the first surface of said ocular optical system is a transmitting surface which is concave toward the observer's eyeball.

13. An image display apparatus according to claim 10, which satisfies the following condition:

$$R_{y1}/R_{y2}<1$$

where $R_{y1}$ is a curvature radius of the first surface of said ocular optical system in a plane containing both said observer's visual axis and a center of said image display device, and $R_{y2}$ is a curvature radius of the second surface of said ocular optical system in said plane.

14. An image display apparatus according to claim 10, which satisfies the following condition:

$$R_{y1}/R_{y2}<0.8$$

where $R_{y1}$ is a curvature radius of the first surface of said ocular optical system in a plane containing both said observer's visual axis and a center of said image display device, and $R_{y2}$ is a curvature radius of the second surface of said ocular optical system in said plane.

15. An image display apparatus according to claim 10, wherein the second surface of said ocular optical system has a rotationally asymmetric configuration.

16. An image display apparatus according to claim 10, wherein the second surface of said ocular optical system is an anamorphic aspherical surface.

17. An image display apparatus according to claim 10, wherein the second surface of said ocular optical system is tilted and, at the same time, decentered with respect to said visual axis.

18. An image display apparatus according to claim 10, wherein said ocular optical system has a right ocular optical system for leading light to an observer's right eyeball, and a left ocular optical system for leading light to an observer's left eyeball, so that an image formed on the image display surface of said image display device is led to both said right and left ocular optical systems.

19. An image display apparatus comprising:
an image display device for displaying an image; and
an optical system for projecting an image formed by said image display device without forming an intermediate image and for leading the projected image to an observer's eyeball,
said optical system including at least one concave mirror having a rotationally asymmetric reflecting surface which is concave toward the observer's eyeball and decentered with respect to an optical axis, and at least one optical element of positive refractive power which is disposed between said concave mirror and said image display device,
wherein $R_{y2}$ a curvature radius of the reflecting surface of said concave mirror in a plane containing both said observer's visual axis and a center of said image display device, $R_{x2}$ is a curvature radius of the reflecting surface of said concave mirror in a plane which perpendicularly intersects said plane containing both said observer's visual axis and a center of said image display device and which contains said observer's visual axis, and $R_{x2}$ has a first value, $R_{y2}$ has a second value selected from one of sets A or B, where A is the set of all values greater said first value and B is the set of all values less than said first value.

20. An image display apparatus according to claim 19, wherein, the curvature radii $R_{x2}$ and $R_{y2}$ of the reflecting surface of said concave mirror satisfy the following condition:

$$R_{y2}/R_{x2} \leq 1.$$

21. An image display apparatus according to claim 19, wherein the curvature radii $R_{x2}$ and $R_{y2}$ of the reflecting surface of said concave mirror satisfy the following condition:

$$R_{y2}/R_{x2}<0.8.$$

22. An image display apparatus comprising:
an image display device for displaying an image; and
an ocular optical system for projecting an image formed by said image display device and for leading the projected image to an observer's eyeball,
said ocular optical system having at least a first surface and a second surface, said first surface is disposed closer to the observer's eyeball than said second surface, a space between the first and second surfaces being filled with a medium having a refractive index n larger than 1 (n>1), said first and second surfaces being decentered with respect to an observer's visual axis, said second surface being a curved reflecting or semi-transparent surface which is concave toward the observer's eyeball, said first and second surfaces having different curvatures, and said first and second surfaces being arranged such that light rays emanating from said image display device are refracted by said first surface andthen reflected by said second surface, and the reflected light rays are further refracted by said first surface, thereby allowing a first-order image of said image display device formed by said ocular optical system to enter the observer's eyeball,
wherein $R_{y2}$ is a curvature radius of the second surface of said ocular optical system in a plane containing both said observer's visual axis and a center of said image display device, and $R_{x2}$ is a curvature radius of the second surface of said ocular optical system in a plane which perpendicularly intersects said plane containing both said observer's visual axis and a center of said image display device and which contains said observer's visual axis, and, and $R_{x2}$ has a first value, $R_{y2}$ has a second value selected from one of sets A or B, where A is the set of all values greater said first value and B is the set of all values less than said first value.

23. An image display apparatus according to claim 22, wherein the curvature radii $R_{x2}$ and $R_{y2}$ of the second surface of said ocular optical system satisfy the following condition:

$$R_{y2}/R_{x2} \leq 1.$$

24. An image display apparatus according to claim 21, wherein the curvature radii $R_{x2}$ and $R_{y2}$ of the second surface of said ocular optical system satisfy the following condition:

$R_{y2}/R_{x2}<0.8$.

25. An image display apparatus comprising:

an image display device for displaying an image; and an ocular optical system for projecting an image formed by said image display device and for leading the projected image to an observer's eyeball, said ocular optical system having at least a first surface and a second surface, said first surface is disposed closer to the observer's eyeball than said second surface, a space between the first and second surfaces being filled with a medium having a refractive index n larger than 1 (n>1), said first and second surfaces being decentered with respect to an observer's visual axis, said second surface being a curved reflecting or semi-transparent surface which is concave toward the observer's eyeball, said first and second surfaces having different curvatures, and said first and second surfaces being arranged such that light rays emanating from said image display device are refracted by said first surface and then reflected by said second surface, and the reflected light rays are further refracted by said first surface, thereby allowing a first-order image of said image display device formed by said ocular optical system to enter the observer's eyeball, said ocular optical system further having an optical element of positive refractive power, said optical element being provided between said observer's eyeball and said first and second surfaces, and said image display device satisfies the following condition:

$$5°<\theta_2<25°$$

where $\theta_2$ is an angle at which an optical axis extending from said image display device is reflected by the second surface of said ocular optical system to said observer's eyeball.

26. An image display apparatus according to claim 25, wherein said optical element of positive refractive power is a lens of positive refractive power.

27. An image display apparatus according to claim 25, wherein said optical element of positive refractive power is decentered with respect to said observer's visual axis.

28. An image display apparatus according to claim 25, wherein said optical element of positive refractive power is a cemented lens.

29. An image display apparatus according to claim 10 or 25, further comprising means for positioning both said image display device and said ocular optical system with respect to an observer's head.

30. An image display apparatus according to claim 10 or 25, further comprising means for supporting both said image display device and said ocular optical system with respect to an observer's head, thereby allowing said image display apparatus to be fitted to the observer's head.

31. An image display apparatus according to claim 10 or 25, further comprising means for supporting at least a pair of said image display apparatuses at a predetermined spacing.

32. An image display apparatus according to claim 10 or 25, wherein said image display device is disposed forwardly of an observer's face, and said image display device is disposed so that an image display surface of said image display device faces in a forward direction from the observer's face, and a reverse side of said image display device faces opposite to the observer's face.

33. An image display apparatus according to claim 25, which satisfies the following condition:

$$7°<\theta_2<15°$$

where $\theta_2$ is an angle at which an optical axis extending from said image display device is reflected by the second surface of said ocular optical system to said observer's eyeball.

34. An image display apparatus according to claim 25, which satisfies the following condition:

$$0.6<(\theta_1/\theta_3)\times n<1.6$$

where $\theta_3$ is an angle formed between a line normal to the first surface of said ocular optical system and an optical axis extending from said image display device after it has been incident on said first surface, $\theta_1$ is an angle formed between a line normal to said first surface and the optical axis from said image display device when it exits from said first surface after being reflected by the second surface of said ocular optical system, and n is a refractive index of a medium lying between the first and second surfaces.

35. An image display apparatus according to claim 25, which satisfies the following condition:

$$0.8<(\theta_1/\theta_3)\times n<1.6$$

where $\theta_3$ is an angle formed between a line normal to the first surface of said ocular optical system and an optical axis extending from said image display device after it has been incident on said first surface, $\theta_1$ is an angle formed between a line normal to said first surface and the optical axis from said image display device when it exits from said first surface after being reflected by the second surface of said ocular optical system, and n is a refractive index of a medium lying between the first and second surfaces.

* * * * *